United States Patent [19]
Whitmire et al.

[11] Patent Number: 6,167,403
[45] Date of Patent: Dec. 26, 2000

[54] NETWORK DEVICE WITH SELECTABLE TRAP DEFINITIONS

[75] Inventors: Laura E. Whitmire, Dallas County; Gang Fang; Timothy Michals, both of Denton County, all of Tex.

[73] Assignee: Compaq Computer Corporation, Houston, Tex.

[21] Appl. No.: 09/078,721

[22] Filed: May 14, 1998

Related U.S. Application Data

[60] Provisional application No. 60/050,501, Jun. 23, 1997.

[51] Int. Cl.[7] .................................................. G06F 17/30
[52] U.S. Cl. .......................... 707/10; 707/103; 709/223
[58] Field of Search ................................... 707/100–103, 707/200–202, 10; 709/201–204, 223, 226

[56] References Cited

U.S. PATENT DOCUMENTS

| | | | |
|---|---|---|---|
| 5,471,617 | 11/1995 | Farrand et al. | 395/700 |
| 5,745,897 | 4/1998 | Perkins et al. | 707/101 |
| 5,864,865 | 1/1999 | Lakis | 707/103 |
| 5,889,470 | 3/1999 | Kaycee et al. | 340/825.07 |

FOREIGN PATENT DOCUMENTS

0831617A2  3/1998  European Pat. Off. .

OTHER PUBLICATIONS

"Business Data Communications," Stallings et al., Third Edition, Prentice–Hall, Inc., Chapter 16, pp. 489–494, Apr. 1997.

*Primary Examiner*—Hosain T. Alam
*Attorney, Agent, or Firm*—Akin, Gump, Strauss, Hauer & Feld, LLP

[57] ABSTRACT

A network device with selectable traps that improves network management by enabling a system manager or administrator to select between multiple trap definitions. The network device includes a memory that stores a management database including a plurality of trap definitions and a programmable parameter for selecting any one of the trap definitions. The network device further includes management processing logic that executes a management agent that issues traps according a selected one of the trap definitions depending upon the programmable parameter. In the embodiment described herein, the management database includes the standard Ethernet™ Repeater MIB implemented according to RFC 1516 including a first trap definition and the Ethernet™ Hub MIB by Novell including a second trap definition. The management agent issues traps according to either one of the trap definitions depending upon the programmable parameter.

19 Claims, 15 Drawing Sheets

NETWORK DEVICE WITH SELECTABLE TRAP DEFINITIONS

CROSS REFERENCE TO RELATED APPLICATIONS

The present application is based on U.S. Provisional Application Serial No. 60/050,501 entitled "Dual Speed Stackable Repeater" filed Jun. 23, 1997, which is hereby incorporated herein by reference in its entirety.

FIELD OF THE INVENTION

The present invention relates generally to networks for communication, and more particularly to a network device with selectable trap definitions.

DESCRIPTION OF THE RELATED ART

Networks serve the purpose of connecting many different electronic devices such as computers, telecommunications devices, printers, file servers etc., so that expensive computing assets may be shared among many users. Such computing assets include, but are not limited to, data and software including programs, files, local and global directories, and databases, and hardware including computers, printers, facsimile machines, copiers, mass storage media, etc., and any combination thereof.

Various communication protocols and standards for networks have been developed to standardize the way in which data packets are transmitted across the data exchange media of the network. For example, Ethernet™, Token Ring™, Fiber Optic Inter-Repeater Link (FOIRL) and Fiber Distributed Data Interface (FDDI) are some of the commonly known network media standards. Also, each standard has its own baseband transmission rate achievable on an applicable physical medium. Ethernet™ is a shared-media network architecture defined in the Institute of Electrical and Electronics Engineers (IEEE) 802.3 standard, and is currently the most widely used architecture for local-area networks (LANs). Ethernet™ uses both bus and star topologies. The 10Base-T is a physical layer standard based on the IEEE 802.3k specification, which is a baseband 802.3-based Ethernet™ network that operates up to 10 Mbps (megabits per second), and is configured in a star topology.

Another Ethernet™ standard has emerged, referred to as Fast Ethernet™ or 100Base-T Ethernet™, which includes implementations capable of 100 Mbps transmissions speeds and is defined in IEEE 802.3u. 100Base-T covers three media types, which includes 100Base-T4 using four pairs of category 3, 4 or 5 unshielded twisted-pair (UTP) wire, and another twisted-wire pair scheme referred to as 100Base-TX using two pairs of category 5 UTP or shielded twisted-pair (STP) wire. Also, a 100Base-FX scheme is defined for use with fiber optic cables. It is noted that the present disclosure and invention is not limited to any particular communications protocol, communication speed, or standard, and may be applied to other protocols and mediums. For example, fiber optic and Copper Distributed Data Interface (CDDI) systems are also contemplated.

In a star configuration, several nodes or computers are connected together through a common hub, which is otherwise referred to as a repeater in Ethernet™ topologies. A repeater is a hardware device that generally functions at the physical layer of the Open Systems Interconnection (OSI) Reference Model to provide a common termination point for multiple nodes. In particular, a repeater receives data from one node and re-transmits the data to other nodes attached to the repeater. Repeaters usually accommodate a plurality of nodes, such as 4, 8, 12 or more nodes, and some repeaters include connectors for linking to other repeaters. Each node in the network is typically a computer of some type, such as a personal computer (PC), Macintosh, minicomputer, mainframe, or the like, where the computer generally includes a network interface card (NIC) for interfacing the node to the repeater to enable networking capabilities. A node may also be a passive device that does not transmit, such as a printer. In the present disclosure, each node is associated with a network device or data terminal equipment (DTE), where each node generally refers to any source and/or destination of data connected to any network system, such as a LAN or the like.

Presently, there is a trend in network technology towards internetworking or enterprise networking, that is, interconnecting networks of different baseband transmission rates to achieve even greater shared access across a larger number of network stations. A current approach to attaining this objective is to use a 2-port bridge device capable of filtering data packets between different network segments or domains by making simple forward/don't forward decisions on each data packet it receives from any of the segments to which it is connected. As is understood in the art, these segments may be provided with a structured wiring architecture such that a repeater (or, synonymously, a hub) or a multi-station access unit (MAU) provides a central connection point for wiring the network stations disposed in that domain.

In a conventional configuration, one of the ports of the hub for a domain with one baseband transmission rate is connected to one port of the 2-port bridge device, whereas a second hub for a second domain with the same or a different baseband transmission rate is connected to the other bridge port. As can be readily appreciated by those skilled in the art, at least three separate devices must be interconnected, managed, maintained and serviced in order to provide the conventional internetworking solution. Several disadvantages of this arrangement are readily apparent, including less reliability, expensive maintenance, and suboptimal usage of form-factor.

Accordingly, it should be appreciated that there has arisen a need for an internetworking system that can operate with segments of different baseband transmission rates in a single integrated device. A device that is capable of switch functions at a higher baseband rate is relatively expensive. Also, if several slower speed devices are connected to a single high speed device, such as a server, much of the high speed switch capability is wasted, resulting in an inefficient design. It is desired to provide a cost effective and efficient network for enabling communication among data devices operating at different communication rates. It is further desired to improve effective management of the network.

SUMMARY OF THE INVENTION

A network device with selectable traps according to the present invention improves network management by enabling a system manager or administrator to select among multiple trap definitions. The network device includes a memory that stores a management database including a plurality of trap definitions and a programmable parameter for selecting any one of the trap definitions. The network device further includes management processing logic that executes a management agent that issues traps according a selected one of the plurality of trap definitions depending upon the programmable parameter. The management database may include a first management database including a first set of trap definitions, a second management database including a second set of trap definitions, where the parameter is programmed to select between the first and second sets of trap definitions. The management agent issues traps according to either one of the first and second sets of trap definitions depending upon the programmable parameter.

The management databases may be implemented according to a Management Information Base (MIB) pursuant to the Internet Engineering Task Force (IETN) Simple Network Management Protocol (SNMP). For example, a first MIB is preferably the standard Ethernet™ Repeater MIB implemented according to RFC (request for comments) 1516, and a second MIB is preferably the Ethernet™ Hub MIB by Novell. Both of these MIBs include similar traps, such as health state, group change and reset, that are issued under the same circumstances. However, the management agent provides different information when issuing the trap depending upon the selected definition. In this manner, if a management application is used that is compatible with RFC 1516, then it is desired to use the first MIB to issue traps compatible with RFC 1516. Alternatively, if a management application is used that is compatible with Novell's Ethernet™ Hub MIB, such as Novell's ManageWise™, then it is desired to use the second MIB to issue traps compatible with Novell's Ethernet™ Hub MIB. In this manner, the network device is programmable to support either trap type and definition.

The programmable parameter preferably corresponds to an object of a private or enterprise specific management database used by the management agent to determine which types of traps to issue. The parameter preferably has a default, such as according to RFC 1516. Also, the parameter is preferably stored in nonvolatile memory so that it remains unchanged during power cycles.

The network device is typically part of a network system and includes an interface for coupling to a management unit. The management unit programs the parameter and receives traps via the interface. The interface may be any network port of the network device for in-band management. Alternatively, interface may comprise a serial port for out-of-band management. The network device may comprise a multiple port repeater device, for example, which executes a management agent compatible with SNMP. The management unit may execute a management console according to or otherwise compatible with SNMP. In this manner, the management console programs the parameter by sending an SNMP request to the management agent. The management agent programs the parameter and then issues traps according to the selected trap definition.

Accordingly, it should be appreciated that a system according to the present invention improves management by allowing selection of any one of a plurality of trap definitions.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1A:
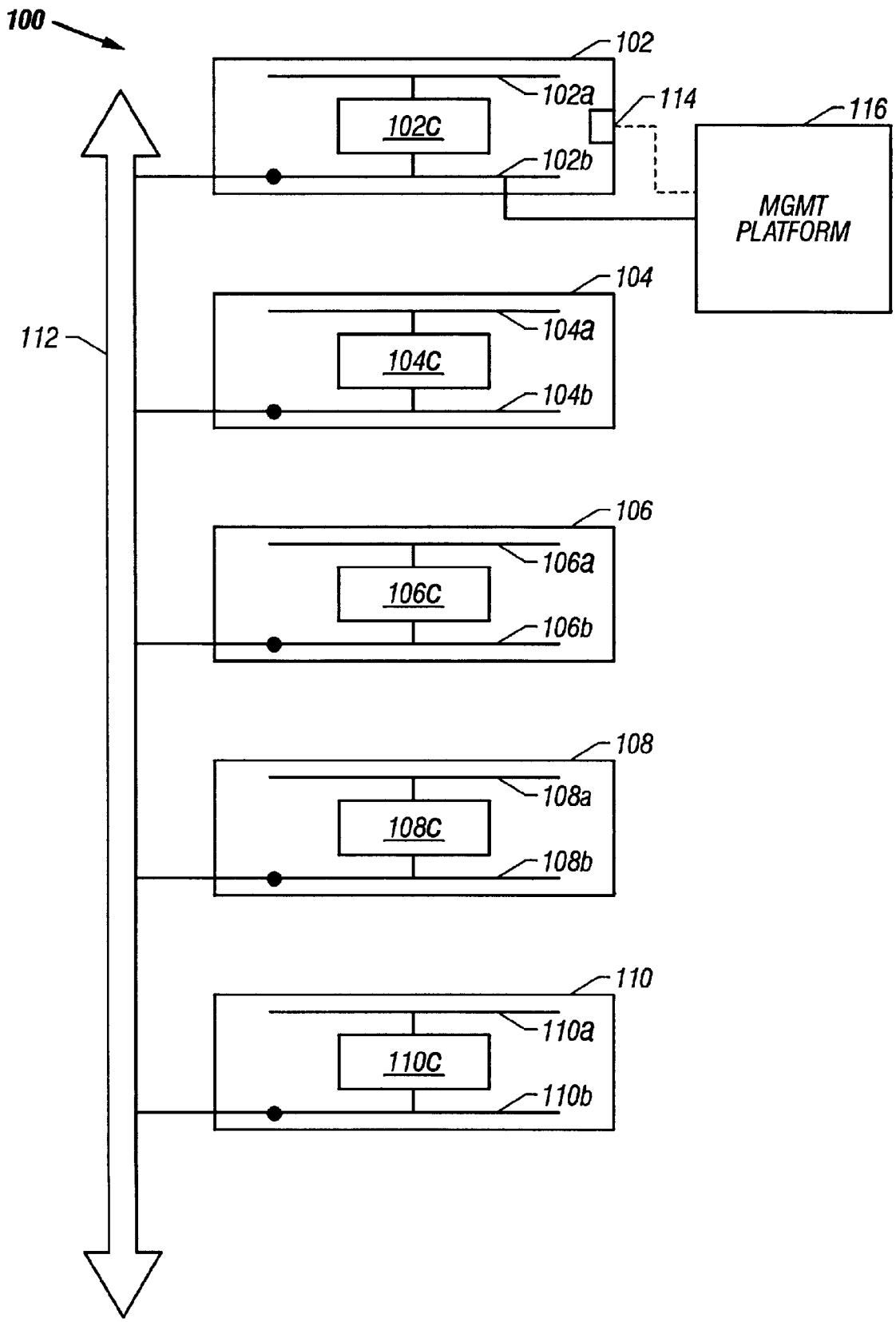
FIG. 1A is a simplified block diagram of a network system including a plurality of network devices implemented according to the present invention coupled together in a managed stack configuration.

Referring now to FIG. 1A, a simplified block diagram is shown of a network system 100 including a plurality of network devices implemented according to the present invention coupled together in a managed stack configuration. The network devices are multiple port repeaters 102, 104, 106, 108 and 110 physically and logically coupled together across a common backplane bus 112. Each of the repeaters 102–110 includes a first segment 102a, 104a, 106a, 108a and 110a, respectively, and a second segment 102b, 104b, 106b, 108b and 110b, respectively. The first segments 102a–110a operate at a first transmission rate and the second segments 102b–110b operate at a second transmission rate.

In the embodiment shown, the first segments 102a–110a are Ethernet™ 10 Mbps repeater segments operating according the Ethernet™ 10Base-T standard. The 10 Mbps repeater function is optionally 10Base-T compliant supporting up to four repeater hops. The second segments 102b–110b are Ethernet™ 100 Mbps repeater segments each operating according to the Ethernet™ 100Base-TX standard. Each of the segments 102b–110b are coupled together via the common backplane bus 112. As described further below, the backplane bus 112 includes a repeater portion 112a (FIG. 13) and a management portion 112b. In the embodiment shown, the repeater portion 112a of the common backplane bus 112 includes a Fast Ethernet™ component that operates at a transmission rate of 100 Mbps, where the 100 Mbps repeater function is preferably according to 100Base-TX Class I. The present invention, however, is not limited to any particular protocol or transmission rate or class and contemplates a plurality of different protocols and transmission rates. For example, the slower segments 102a–110a may operate at 100 Mbps while the faster segments 102b–110b and the repeater portion 112a of the backplane bus 112 operate at a transmission rate of one gigabit per second (Gbps). Further, a configuration with more than two segments per unit is contemplated and the backplane may be disposed between any corresponding segments.

Segmentation is the process of isolating or coupling an individual segment from/to a common collision domain. Each of the switch devices 102c–110c may be separately disabled, so that any one or more of the segments 102a–110a may be separated from its corresponding segment 102b–110b, respectively, and thus separated from the repeater portion 112a of the backplane bus 112. Also, each of the repeaters 102–110 may be separately disconnected from the repeater portion 112a of the common backplane bus 112 and thus from the common collision domain.

Each of the repeaters 102–110 further includes a two-port learning bridge or switch device 102c, 104c, 106c, 108c and 110c, respectively. Each switch device 102c–110c is coupled to a corresponding segment 102a–110a, respectively, and to a corresponding segment 102b–110b, respectively, within the repeaters 102–110, respectively, as shown in FIG. 1A. The segments 102b–110b are incorporated into the same repeater or collision domain via the repeater portion 112a of the backplane bus 112. Each of the segments 102a–110a are in separate collision domains, which thereby reduces the number of collisions on each of the segments 102a–110a and the segments 102b–110b including the repeater portion 112a. Nonetheless, as further described below, the switch devices 102c–110c enable communication and data transfer between each of the segments 102a–110a and the corresponding segments 102b–110b, respectively. In this manner, a network device or node coupled to any one of the segments 102a–110a may communicate with any device on any other segment of any of the repeaters 102, 104, 106, 108 and 110. The stacked configuration with multiple segments is transparent to each network device coupled to any port of any of the repeaters 102–110, so the each network device appears to be part of the same logical LAN.

Any one of the repeaters 102–110 is operable as a standalone unit. Any two of the manageable repeaters 104–110 may be coupled together with a one-to-one physical backplane connection in an unmanaged stack configuration, resulting in one repeater domain with one repeater hop. For example, the repeaters 104 and 106 may be coupled together in an unmanaged stack configuration. The respective segments 104a and 106a are interconnected via the switch devices 104c and 106c and the segments 104b and 106b via the backplane bus 112, where the switch devices 104c, 106c act as store and forward devices with modified MAC (media access control) address filtering.

In the embodiment shown, the network system 100 is a managed stack configuration, in which one of the repeaters, such as the repeater 102, is a managing unit and the remaining repeaters 104–110 are manageable units. All of the ports of the repeaters 102–110 have access to a management agent 1302 (FIG. 13) implemented within the managing repeater 102 regardless of connection speed as long as they have access to the management portion 112b of the common backplane bus 112. The ports of the segment 102b always have access to the management agent 1302 of the managing repeater 102. However, if any of the switch devices 102c–110c is disabled, the corresponding segments 102a–110a, respectively, lose their access to the management agent 1302. Of course, when any of the manageable repeaters 104–110 is disconnected from the repeater portion 112a, the ports of the disconnected manageable repeater lose access to the management agent 1302.

As described further below, the managing repeater 102 is assigned a single Media Access Control (MAC) address, otherwise called a hardware or physical address, which is an industry-wide unique address identifier including six (6) bytes. The management agent 1302, which manages the entire managed stack configuration, is accessible via the using single MAC address. Also, at the higher level network layer, a single local Internet Protocol (IP) address (32-bit for version 4, 128-bit for version 6) or network address may be used for all segments of the stack as part of a single logical LAN rather than having to assign separate addresses for each of the segments or for each different collision domain. This results in a less expensive implementation by elimination of at least one MAC device, yet provides a more convenient LAN configuration. In this manner, devices coupled to any of the ports of each of the repeaters 102–110 are part of the same logical domain or LAN. Thus, in the managed stack configuration using the backplane bus 112, the network devices coupled to any of the repeaters 102–110 are part or the same logical domain or LAN via the common backplane bus 112.

In the managed stack configuration shown in FIG. 1A, a network management station or platform 116 is coupled to any one of the ports of the repeaters 102–110 for "in-band" management. The managing repeater 102 also includes a serial port 114 that couples to and interfaces with the management platform 116 for various purposes including "out-of-band" management. The management platform 116 is able to manage the entire network system 100 via the management agent 1302 of the managing repeater 102. The management platform 116 may be as simple as a Management Information Base (MIB) browser for accessing MIB objects of one or more MIBs supported within the repeaters 102–110. The management platform 116 may be more sophisticated, such as a management console running an SNMP (Simple Network Management Protocol) network management application using SNMP over IP or over IPX (Internetwork Packet Exchange). The SNMP management application submits management requests, such as enable/disable ports, backup port assignments, trap table entries, statistics, etc. to a SNMP management agent 1302 within a management module within the managing repeater 102. The repeater 102 also preferably supports a VT100 terminal emulation interface via the serial port 114 for supporting basic management and configuration functions. For SNMP out-of-band management using the management platform 116 via the serial port 114, a Serial Line Internet Protocol (SLIP) or Point-to-Point Protocol (PPP) is established for exchanging packets between the managing repeater 102 and the management platform 116 via the serial interface. The serial port 114 also enables remote terminal emulation or management using a modem.

Figure 1B:
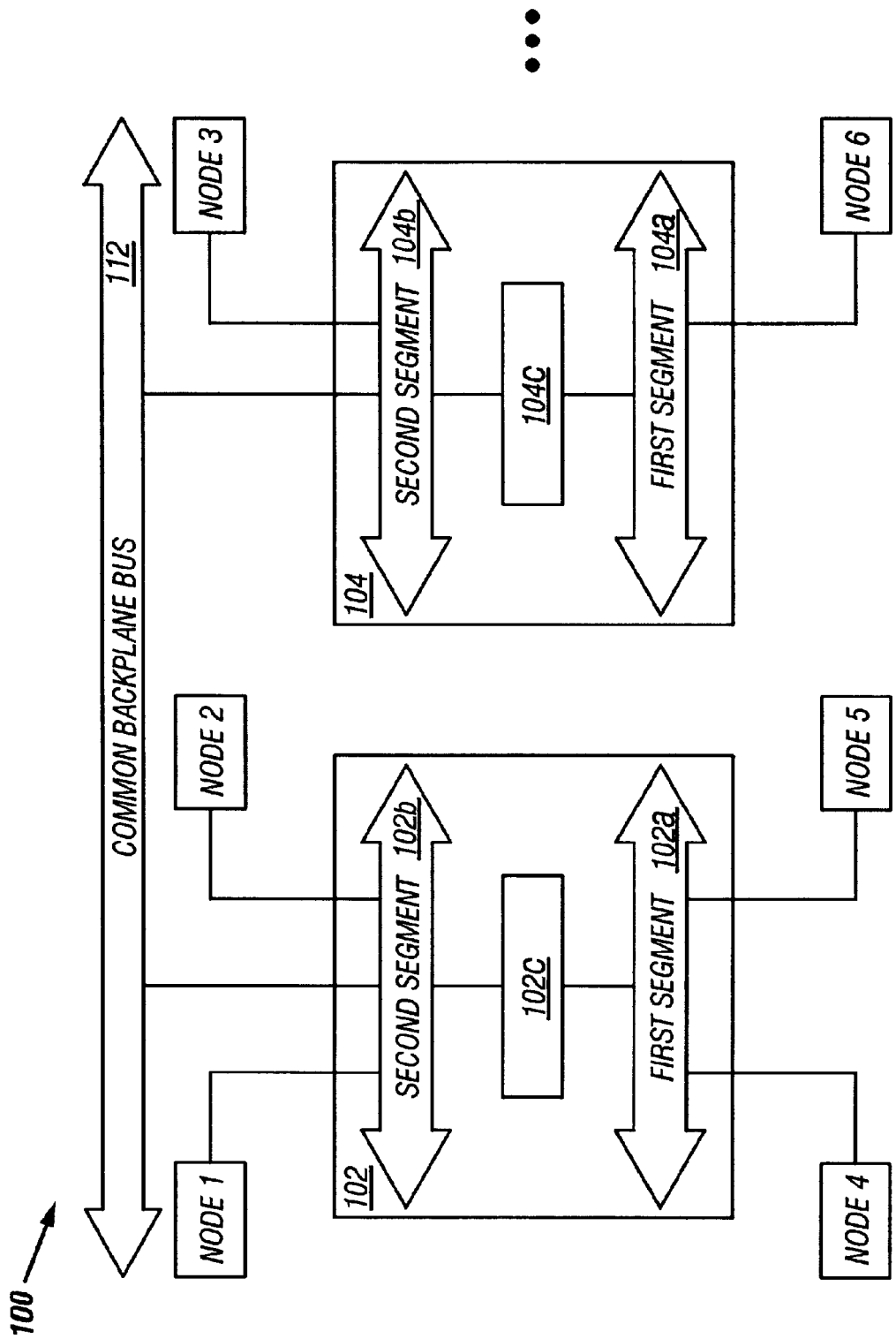
FIG. 1B is a simplified diagram illustrating several nodes, such as computer systems or the like, coupled to the network system of FIG. 1A.

FIG. 1B is an exemplary diagram illustrating several nodes NODE 1, NODE 2, NODE 3, NODE 4, NODE 5 and NODE 6, such as computer systems or the like, coupled to the network system 100. In particular, nodes NODE 1 and NODE 2 are each coupled to the segment 102b of the repeater 102, NODE 3 is coupled to the segment 104b of the repeater 104, NODE 4 and NODE 5 are each coupled to the segment 102a of repeater 102 and NODE 6 is coupled to the segment 104a of repeater 104. Communication between each of the nodes occurs using Ethernet™ packets, each including source and destination MAC addresses. Packets may be unicast, multicast or broadcast. For broadcast packets, the "destination" address indicates that the packet should be broadcast to every other device or to multiple devices. Unicast packets include a destination MAC address identifying a particular node or network device for which the packet is intended. A packet transmitted by NODE 1 to NODE 3 is received and then repeated by the segment 102b to NODE 2 and to the repeater portion 112a of the backplane bus 112. The packet is received by segment 104b of the repeater 104, which repeats the packet to NODE 3. NODE 3 may respond with a packet of its own, which is received and repeated by the segment 104b to the repeater portion 112a of the backplane bus 112. The packet is received by the segment 102b and repeated to both nodes NODE 1 and NODE 2, so that NODE 1 receives the response packet. NODE 2 may ignore or drop the packet if it is not addressed to NODE 2.

In the embodiment shown, the switch devices 102c–110c learn the MAC addresses of devices coupled to ports that are connected to the first segments 102a–110a, respectively. The switch devices 102c–110c, however, do not learn the MAC addresses of devices coupled to ports that are connected the second segments 102b–110b, respectively. In alternative embodiments, the switch devices 102c–110c are configured to learn the MAC addresses of devices coupled to both the first and second segments 102a–110a and 102b–110b. In the embodiment shown, the switch device 102c learns the MAC addresses for NODE 4 and NODE 5, and the switch device 104c learns the MAC address for NODE 6. The switch devices 102c–110c forward packets from a respective second segment 102b–110b to a respective first segment 102a–110a only if the packet includes a destination address that matches a learned MAC address, and thus only if identifying a device on the respective first segment 102a–110a. The switch devices 102c–110c forward packets from a respective first segment 102a–110a to a respective second segment 102b–110b only if the packet includes a destination address that does not match any of its learned MAC addresses, and thus only if not identifying any device on the respective first segment 102a–110a.

For example, if the packet transmitted by NODE 1 included a destination address that identified the MAC address of NODE 5, then the switch device 102c forwards the packet to the segment 102a, which repeats the packet to nodes NODE 4 and NODE 5. The same packet is also received by the switch device 104c, but ignored and not sent to the segment 104a since the switch device 104c does not learn nodes of a separate segment. If a packet sent by NODE 3 included a destination address for NODE 1, then both of the switch devices 102c and 104c filter the packet, so that the packet is not repeated on the first segments 102a and 104a. Local traffic on the first segments 102a–110a is filtered by the respective switch devices 102c–110c. Thus, a packet sent by NODE 4 with a destination MAC address identifying NODE 5 is filtered by the switch device 102c and not asserted on the corresponding second segment 102b. Thus, local first segment traffic is not repeated on the collision domain of the second segment, thereby reducing traffic and collisions on the second segments 102b–110b and the repeater portion 112a of the backplane bus 112.

Network devices or nodes on separate first segments may communicate. Thus, a packet sent by NODE 4 with a destination MAC address identifying NODE 6 is transmitted by the switch device 102c to the second segment 102b since the destination address was not known by the switch device 102c. The second segment 102b repeats the packet to the segment 104b of the repeater 104 via the repeater portion 112a of the backplane bus 112. The switch device 104c recognizes the learned address for NODE 6, and sends the packet to NODE 6 via the first segment 104a.

Figure 2:
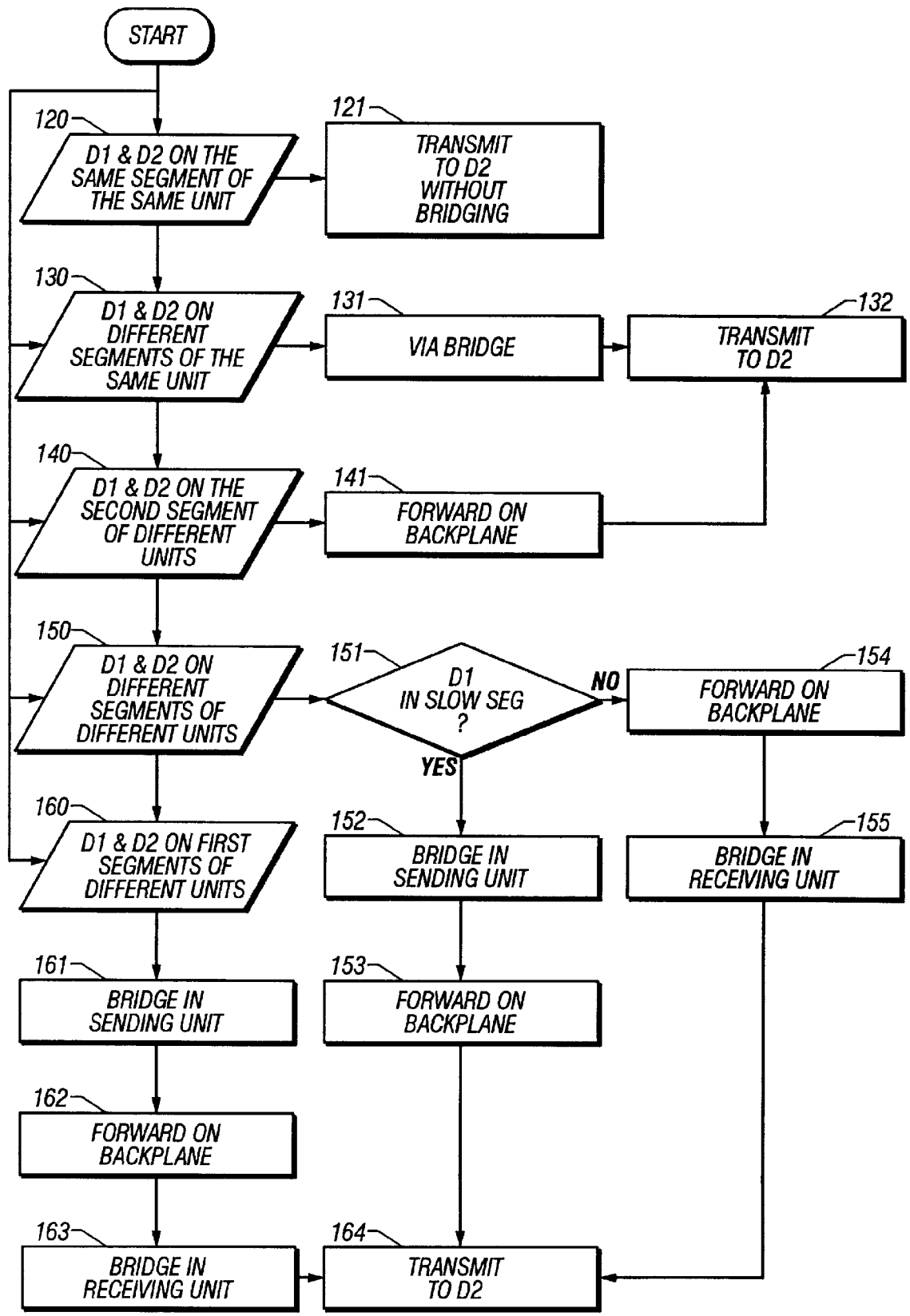
FIG. 2 is a flowchart diagram illustrating exemplary scenarios of transmitting information in a network arrangement provided in accordance with the teachings of the present invention.

Referring now to FIG. 2, a flowchart diagram is shown illustrating exemplary scenarios of transmitting information in a network arrangement provided in accordance with the teachings of the present invention. FIG. 2 illustrates transmitting information from a network station D1 to a receiving network station D2 within a multi-segmented network having a managed stack such as, for example, the managed stack network system 100 shown in FIGS. 1A and 1B. As can be appreciated by those skilled in the art, the network stations D1 and D2 may be disposed in two different domains operating on different baseband signaling specifications. Thus, it should be understood that based on different combinations several scenarios for communication signal flow may occur. For example, D1 may be coupled to a slower segment, such as, for example, the first segment 102a of the multiple port repeater 102 shown in FIG. 1A, whereas D2 may be coupled to a faster segment, such as for example, the second segment 108b of the multiple port repeater 108. On the other hand, D1 may be coupled to a faster segment while D2 is coupled to a slower segment. Moreover, D1 and D2 may be attached to segments of the same unit or to segments of different units in the stack. Accordingly, it should be appreciated that the flow diagram provided in FIG. 2 illustrates an exemplary methodology for signal flow in the various alternative scenarios rather than a sequential flow of a series of decision steps.

A network transmission is initiated from D1 and it is presumed that D2 is the intended receiver. A first transmission scenario 120 illustrates the situation when both D1 and D2 are connected to the same repeater unit and are disposed on the same network segment. In this case, the transmission is made from D1 to D2 as shown at step 121 without bridging via a switching device, which transmission may be made according to a suitable communications standard that is used for the network segment. In scenario 130, both D1 and D2 are attached to the same unit but are disposed on two different segments. That is, if D1 is on a fast segment, D2 is on the slow segment and vice versa. In this case the integrated switching functionality of the repeater unit, such as performed by any one of the switching devices 102c–110c, is utilized as shown at step 131 to effectuate the data transmission from D1 to D2 at step 132.

Continuing to refer to FIG. 2, scenarios 140, 150 and 160 describe situations wherein D1 and D2 are connected to different units of the network system 100. When both D1 and D2 are disposed on a fast segment as in scenario 140, the transmitting unit places the data on the repeater portion 112a of the backplane bus 112 at step 141 which is received by the receiving unit to which D2 is attached. D2 receives the transmitted information at step 132 without any need for intermediate bridging.

When D1 and D2 are disposed on different segments of different units as illustrated by scenario 150, the location for bridging would be based on whether the sending network station D1 is on a slow segment or fast segment, as is indicated at decision step 151. If D1 is on the slow segment, then the information is bridged to the fast segment disposed in the unit to which D1 is attached at step 152, and the information then placed on the repeater portion 112a of the backplane bus 112 at step 153. The information is then received by D2 which is on the fast segment at step 164. On the other hand, if D1 is on the fast segment as determined at step 151, the information is placed on the repeater portion 112a of the backplane bus 112 directly at step 154 and received and bridged at the receiving unit at step 155, where the information subsequently transmitted to the slow segment to D2 at step 164.

When D1 and D2 are on separate slow segments, the information needs to be bridged in the transmitting unit at step 161, and transmitted via the repeater portion 112a of the backplane bus 112 at step 162. Once the information is received at the receiving unit, it is bridged onto the slow segment (step 163) and repeated to the destination station D2 at step 164.

It is appreciated by those skilled in the art that if a separate slow backplane, comparable to the fast backplane, is provided interconnecting the slow segments of the units, then arbitration capability may be incorporated to direct traffic from a slow D1 to a slow D2 either via the bridge-backplane-bridge path or via the direct slow backplane. However, providing additional cabling for the stackable slow backplane and arbitration capability may increase system complexity and inefficiency associated therewith.

Figure 3:
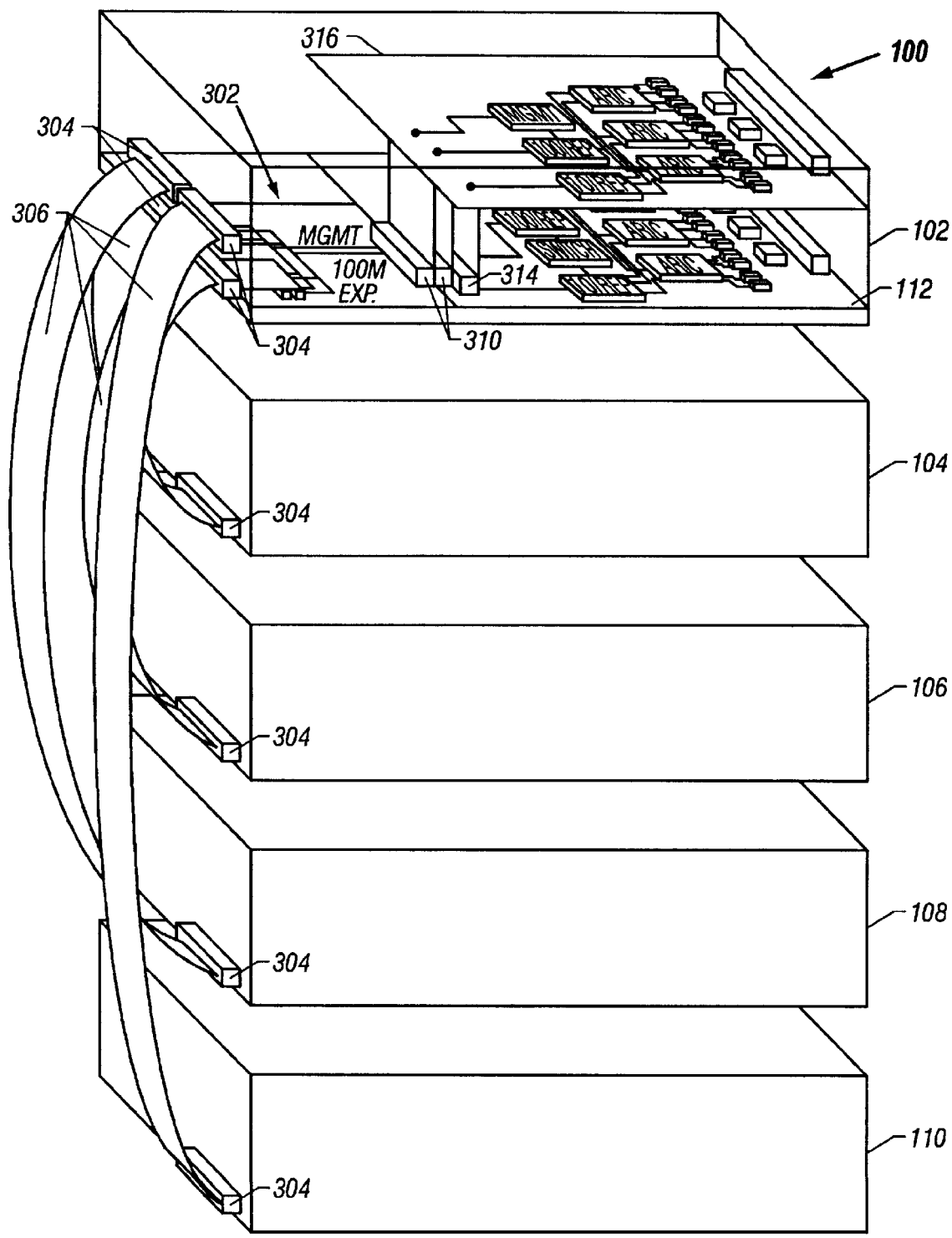
FIG. 3 is a perspective diagram of the network system of FIG. 1A illustrating exemplary physical connections of a managed stack configuration.

Referring now to FIG. 3, a perspective diagram of the network system 100 is shown illustrating the physical connections of a managed stack configuration. The managing repeater 102 includes a backplane expansion interface board 302 that further includes four backplane connectors 304. Each of the manageable repeaters 104–110 includes a single backplane connector 304. Each one of four cables 306, having appropriate and compatible conductors and connectors, is connected between a corresponding one of the four connectors 304 of the managing repeater 102 and the connector 304 of one of the manageable repeaters 104–110. In this manner, the backplane bus 112 is logically a single bus but is physically implemented in a star configuration, where each of the manageable repeaters 104–110 are connected directly to the managing repeater 102, allowing for up to five stacked units in the embodiment shown. Preferably, each of the connectors 304 are female 68-pin SCSI (Small Computer System Interface) II D-type connectors. Each of the cables 306 are preferably 68-conductor shielded flat ribbon cables with male 68-pin SCSI II D-type connectors. Of course, any suitable cable and connector configuration may be used. Also, although only five repeaters are shown in the stacked configuration, it is understood that the present invention is not limited to any particular number of units in the stack. The repeater portion 112a and the management portion 112b of the backplane bus 112 are both included in each of the connectors 304 and cables 306.

The backplane board 302 is connected via a suitable backplane board connector 310 to a managing base board 312 within the managing repeater 102. The managing base board 312 preferably incorporates 12 auto-negotiating 10/100 Ethernet™ ports as further described below. The managing base board 312 further includes a daughter board connector 314 for receiving and connecting a daughter board 316, which also preferably incorporates another 12 auto-negotiating 10/100 Ethernet™ ports for a total of 24 ports. Each of the manageable repeaters 104–110 include similar logic and are implemented in a similar manner as the managing repeater 102, except that the manageable repeaters 104–110 do not include the sophisticated management agent.

Figure 4:
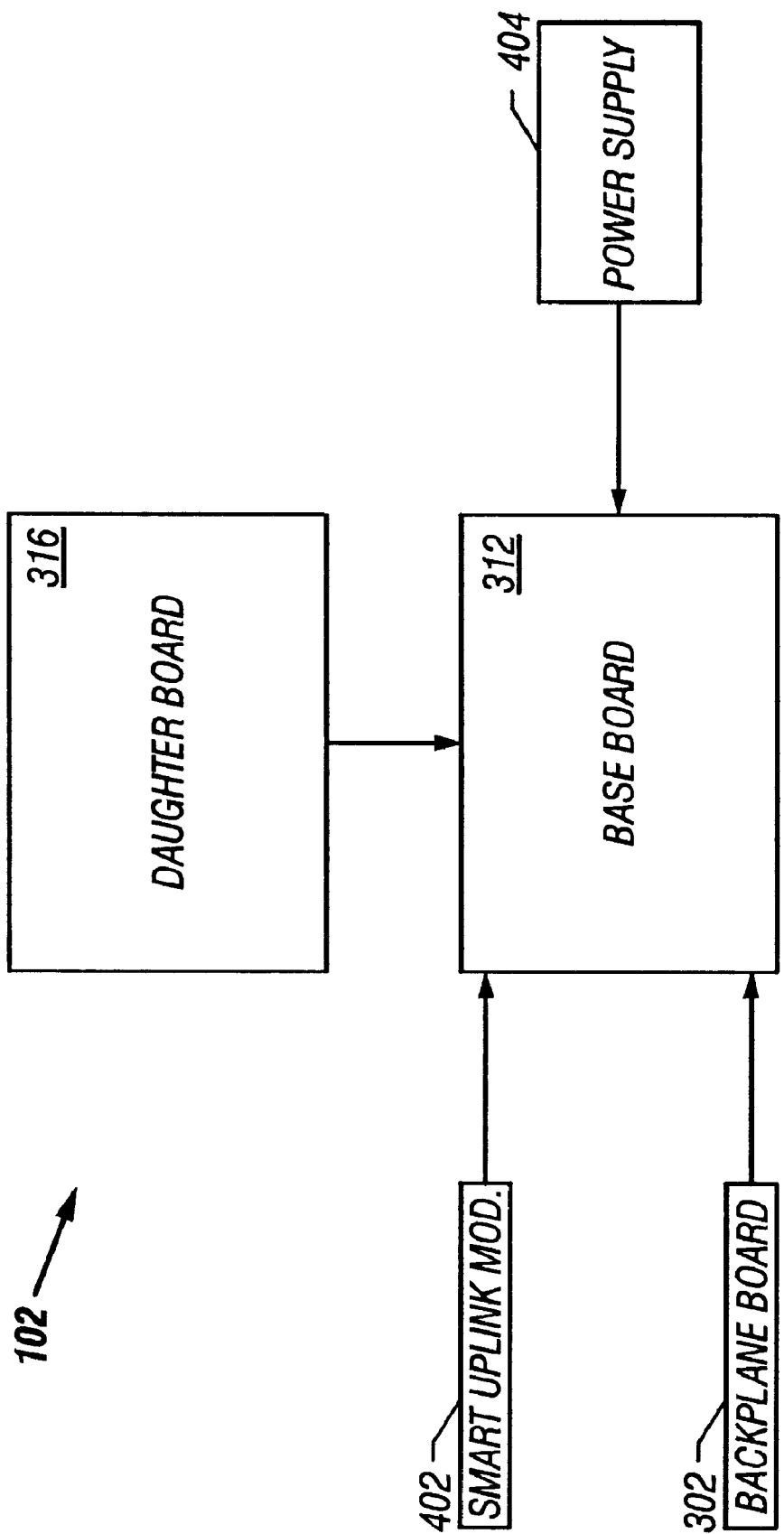
FIG. 4 is a system level block diagram of a managing repeater showing the backplane board and the daughter board.

FIG. 4 is a system level block diagram of the managing repeater 102 showing the backplane board 302 and the daughter board 316 coupled to the managing base board 312. Also shown is a Smart Uplink Module (SUM) 402 and a power supply 404 coupled to the managing base board 312. The optional SUM 402 implements an uplink port that plugs into the base board 312 to enable extension of the topology of the 100 Mbps Class I fast segment beyond the standard 200 meter diameter restriction. The connection is preferably accomplished using a 50-pin connector, and the uplink connection is either a 100Base-TX or 100Base-FX port, although other types of port connections are possible and contemplated.

Figure 5:
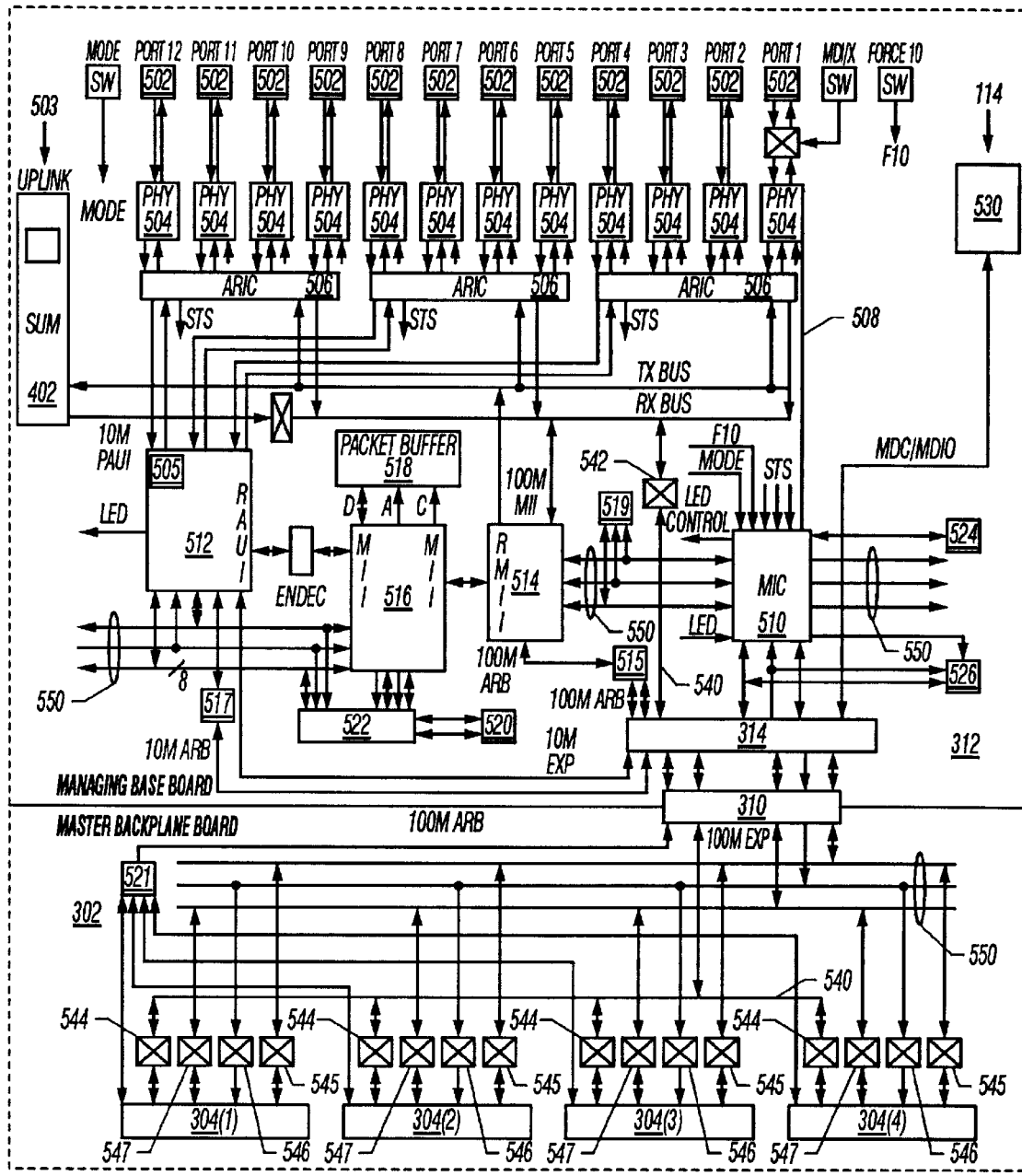
FIG. 5 is a more detailed exemplary block diagram of a managing base board and the backplane expansion interface board of the managing repeater of FIG. 1A.

FIG. 5 is a more detailed block diagram of the managing base board 312 and the backplane expansion interface board 302 of the managing repeater 102. The managing base board 312 includes 12 Ethernet™ ports individually labeled PORT 1–PORT 12. Each of the ports PORT 1–PORT 12 includes a port connector 502 such as an RJ-45 socket for receiving a compatible RJ-45 plug with a twisted-pair cable for coupling to a network device. Each port connector 502 is coupled to a physical layer circuit 504 containing an integrated PHY device and associated magnetic module (isolation transformer and common mode coil, etc.) for isolation and electromagnetic interference (EMI) reduction. Each physical layer circuit 504 is preferably an ICS 1890 dual speed device or the like which supports both 10 and 100 Mbps CSMA/CD (Carrier Sense Multiple Access with Collision Detection) Ethernet™ applications. Each physical layer circuit 504 also includes on-chip auto-negotiation functions that determine the capabilities of the network device coupled thereto and adjusts operation for the highest performance common operating mode. The physical layer circuit 504 preferably supports the IEEE 802.3u Media Independent Interface (MII) for connection to MACs or repeaters, and also implements a 10 Mbps serial bit stream interface. Each of three Adaptive Repeater Interface Controller (ARIC) modules 506 is coupled to and controls four of the physical layer circuits 504. The physical layer circuits 504 are also configured and controlled via an Media Independent Interface (MII) management data serial bus (MDIO) bus 508, which is further coupled to a management interface controller (MIC) 510, further described below.

Each of the ARIC modules 506 is coupled to a 10 Mbps repeater module 512 and a 100 Mbps repeater module 514 via appropriate transmit (TX) and receive (RX) BUS signals to provide a connection between the physical layer circuits 504 and either of the 10 or 100 Mbps repeater modules 512, 514. Each ARIC module 506 monitors link status and connection speed from its physical layer circuits 504 and routes packet data to the appropriate repeater module. At 100 Mbps, the TX BUS and the RX BUS establish a 13-port MII link to enable communication between the coupled network device and the 100 Mbps repeater module 514. The MII link handles 13 ports, one each for the ports PORT 1–PORT 12 and an additional uplink port 503 for the optional SUM 402 so that the optional SUM 402 is coupled via a 100 Mbps MII link to the repeater module 514. At 10 Mbps, a serial bit stream interface via corresponding Pseudo Attachment Unit Interface (PAUI) ports are used to enable communication between each ARIC module 506 the 10 Mbps repeater module 512.

Each ARIC module 506 is preferably a Field Programmable Gate Array (FPGA) design that translates 10 Mbps Non-Return-To-Zero (NRZ) data from a physical layer circuit 504 to Manchester data for PAUI ports, and vice-versa. Each ARIC module 506 multiplexes the RX BUS to eliminate the need for external tri-state buffers, and demultiplexes the 100 Mbps TX BUS from the repeater module 514 to four of the physical layer circuits 504. Each ARIC module 506 provides a connection between four of the physical layer circuits 504 and the respective four ports of each of the repeater modules 512, 514. 10 Mbps network devices are coupled to the 10 Mbps repeater segment of the 10 Mbps repeater module 512 and 100 Mbps network devices are coupled to the 100 Mbps repeater segment of the 100 Mbps repeater module 514 regardless of which of the ports PORT 1–PORT 12 that the network device is connected to. The repeater module 512 is preferably an IMR2 by Advanced Micro Devices, Inc. (AMD). The repeater module 514 is preferably the BCM5012 by Broadcom Corporation.

In general, an MII link includes a bundle of four transmit data signals TXD<3:0>, a bundle of four receive data signals RXD<3:0>, a transmit clock signal TX_CLK, a receive clock signal RX_CLK, a transmit enable signal TX_EN, a transmit coding error signal TX_ER, a receive data valid signal RX_DV, a receive error signal RX_ER, a repeater collision signal COL and a carrier sense signal CRS. In the embodiment shown, each physical layer circuit 504 auto-negotiates with a coupled network node device via a corresponding port connector 502, asserts a respective SPEED signal to indicate either 10 Mbps or 100 Mbps transmission rate and then operates at the indicated transmission rate. Each physical layer circuit 504 includes an MII-type interface to one ARIC module 506 for both 10 and 100 Mbps operation. For the 100 Mbps case, the corresponding SPEED signal indicates 100 Mbps and the MII interface operates in a normal manner. For the 10 Mbps case, the corresponding SPEED signal indicates 10 Mbps and the MII interface is operated in a serial bit stream mode in the NRZ format using only the RXD<0> and TXD<0> signals for data. Also, the RX_CLK and TX_CLK signals are both operated at 10 MHz for the 10 Mbps case. Each ARIC module 506 includes four MII-type ports for both 10 and 100 Mbps operation, where each couples to an MII interface of a corresponding one of the physical layer circuits 504.

In the embodiment shown, the repeater module 514 handles 13 MII ports, but includes only a single MII data port with a single set of RXD<3:0> and TXD<3:0> data pins, one TX_ER pin, one RX_DV pin, one RX_ER, one RX_CLK pin and one TX_CLK pin. The repeater module 514 includes 13 CRS pins, 13 COL pins, 13 LINK pins, 13 TX_EN pins and 13 port enable PORTEN pins and interfaces one port at a time. Each ARIC module 506 includes a single MII data port with a single set of RXD<3:0> and TXD<3:0> data pins, which are coupled to the respective pins of the MII port of the repeater module 514 via the RX BUS and the TX BUS, respectively. Each ARIC module 506 further includes four LINK pins and four CRS pins, which are coupled to four of the 12 LINK and CRS pins of the repeater module 514. Each ARIC module 506 includes four PORTEN input pins which are coupled to a corresponding four of the 12 PORTEN signals of the repeater module 514.

In the embodiment shown, the repeater module 512 includes 12 Pseudo Attachment Unit Interface (PAUI) ports that operate using Manchester encoded data. Each PAUI port includes a pseudo AUI data output (PDO) signal, a pseudo AUI receive data input (PDI) signal and a pseudo AUI collision input (PCI) signal. Each ARIC module 506 includes four PDO1–4, PDI1–4 and PCI1–4 pins that carry the respective PDO1–4, PDI1–4 and PCI1–4 signals that are provided to corresponding PDO1–4, PDI1–4 and PCI1–4 pins of the repeater module 512 for interfacing a respective four of the ports of the repeater 102.

Figure 14:
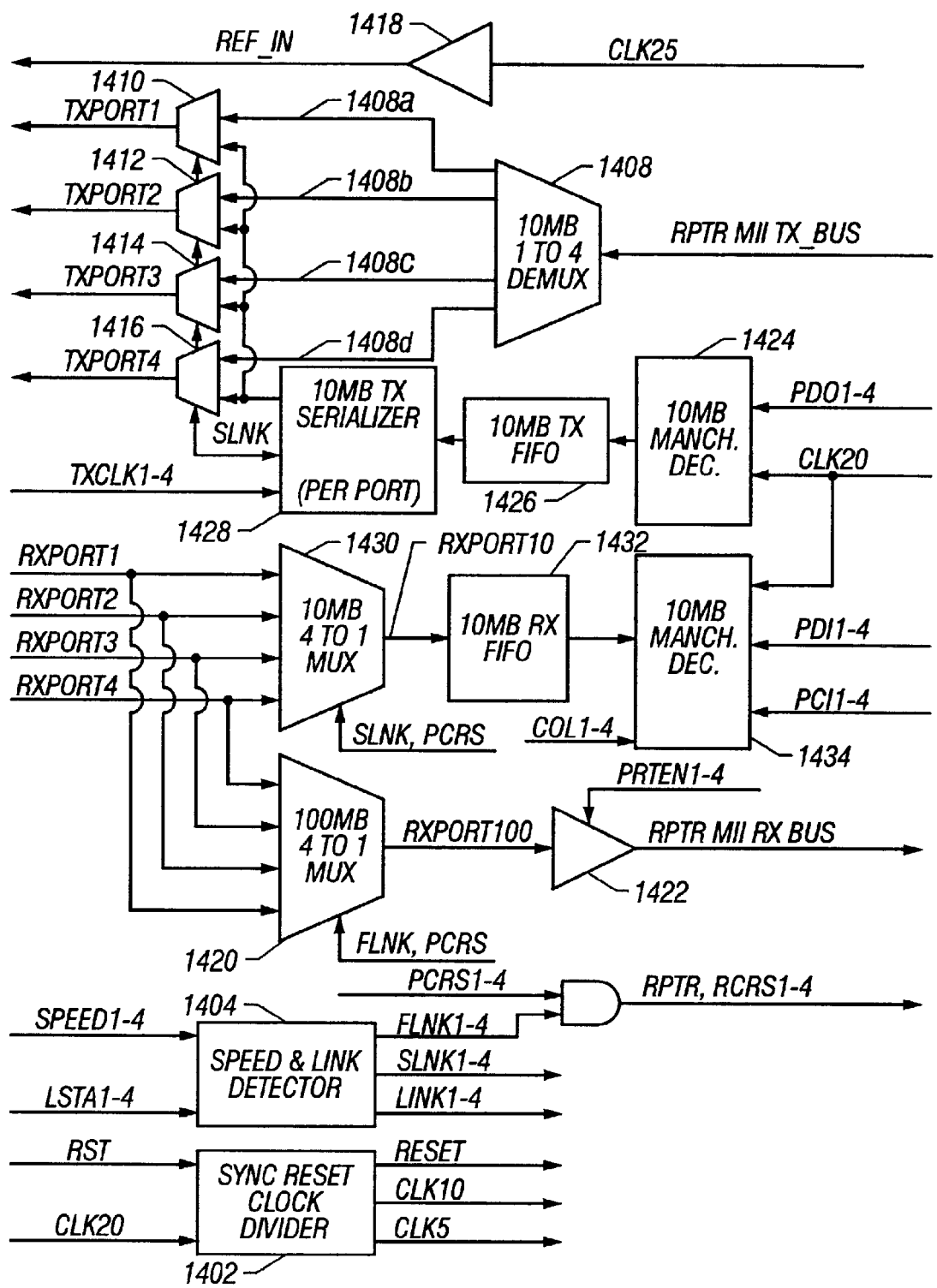
FIG. 14 is a block diagram of the adaptive repeater interface controller modules shown in FIGS. 5–8.

FIG. 14 is a block diagram of each of the ARIC modules 506. Within each ARIC module 506, a clock divider circuit 1402 receives and synchronizes a system reset signal RST and provides a synchronized reset signal RESET. The repeaters 102–110 each include clock circuitry (not shown) for generating a 20 MHz clock signal CLK20 and a 25 MHz clock signal CLK25. The CLK20 signal of the repeater 102 is provided to the clock divider circuit 1402, which generates a 10 MHz clock signal CLK10 and a 5 MHz clock signal CLK5 from the CLK20 signal. Each of the physical layer circuits 504 auto-negotiates the speed of a device or node coupled to a corresponding port and generates a corresponding SPEED signal indicating the transmission rate of the coupled device and a link status signal LSTA. A speed and link detector block 1404 receives four SPEED signals SPEED1–4 and four link status signals LSTA1–4 from four associated physical layer circuits 504 and generates four corresponding 10 Mbps slow link signals SLNK1–4, four corresponding 100 Mbps fast link signals FLNK1–4 and four corresponding link signals LINK1–4. The LINK1–4 signals are coupled to a corresponding four of the 12 LINK pins of the repeater module 514. The LINK1–4 signals each correspond to a corresponding one of either the SLNK1–4 signals or the FLNK1–4 signals depending upon the corresponding SPEED signal. The SLNK1–4 and FLNK1–4 signals are used for purposes of multiplexing the receive paths and demultiplexing the transmit paths, which is further described below.

Each of four port carrier sense signals PCRS1–4 from respective physical layer circuits 504 are logically ANDed together within each ARIC module 506 with a corresponding one of the FLNK1–4 signals with respective 2-input AND logic gates 1406, which provide a corresponding four repeater carrier sense signals RCRS 1–4. In this manner, each carrier sense signal PCRS from the corresponding physical layer circuit 504 is provided to the repeater module 514 in the form of a corresponding RCRS signal only if the port is 100 Mbps. The corresponding link signal LINK is provided to the repeater module 514 regardless of port speed. The physical layer circuits 504 are configured to clock transmit data with a clocking signal REF_IN. The CLK25 signal from the clock circuitry is provided to the input of a buffer 1418, which provides the REF_IN signal at its output. The REF_IN signal minimizes delay skew between the transmit clock CLK25 and the transmit data signals TXD<3:0>.

The TXD<3:0> and TX_EN signals of the TX BUS are provided to the corresponding TXD<3:0> and TX_EN pins of the ARIC module 506, which are coupled to an input of a 1-to-4 demultiplexor (DEMUX) 1408. The four TX_EN signals and corresponding FLNK1–4 signals are used to control the select inputs of the DEMUX 1408 to select one of four transmit paths 1408a, 1408b, 1408c and 1408d when the corresponding TX_EN signal is asserted. The transmit paths 1408a–d are provided to respective inputs of four 2-to-1 MUXs 1410, 1412, 1414 and 1416, respectively, which have respective outputs that provide TXD<3:0> and TX_EN signals, collectively shown as the TXPORT1–4 signals, respectively, to the associated four physical layer circuits 504 handled by the particular ARIC module 506. The select inputs of the MUXs 1410–1416 are controlled by the respective SLNK1–4 signals to select the 100 Mbps transmission paths 1408a–d or corresponding 10 Mbps transmission paths, described below.

The RXD<3:0>, RX_DV and RX_CLK signals of four of physical layer circuits 504, collectively referred to as RXPORT1–4 signals, are provided to four respective inputs of a 4-to-1 MUX 1420, which provides a selected set of RXPORT signals, called RXPORT100, to the inputs of a set of tri-state buffers 1422. Note that four RX_DV1–4 and RX_CLK1–4 signals are provided, one for each of the four ports. Four port enable signals PRTEN1–4 of the corresponding PRTEN pins of the ARIC module 506 are provided to the select inputs of the MUX 1420 to select one of the four ports. The PRTEN1–4 signals are effectively ORed together so that any one asserted enables the buffers 1422 to drive the selected port signals RXPORT100 as the RXD<3:0>, RX_DV and RX_CLK signals of the RX BUS to the repeater module 514.

Since the repeater module 512 transmits data on PDO1–4 signals simultaneously, only one 10 Mbps Manchester decoder 1424 is required for four ports. The Manchester decoder 1424 receives the CLK20 signal and four PDO1–4 signals for four ports, monitors for signal transitions of the combined PDO1–4 signals and aligns data bit-symbols to convert Manchester format to NRZ format. Each bit symbol is split into two halves with the first half containing the logical complement of the bit value and the second half containing the true bit value. The true bit values are provided to the input of a 7×2 (7 bits deep by 2 bits wide) configured TX first-in, first-out buffers (FIFOs) 1426, where each of seven data bits includes a valid flag bit. It is noted that only one TX FIFO 1426 is provided for the four ports. When the Manchester decoder 1424 detects data being transmitted by the repeater module 512 for any of the four ports, it indicates to the TX FIFO 1426 to receive data. The TX FIFO 1426 sets the corresponding valid flags for each valid bit, and the Manchester decoder 1424 signals the last valid data bit.

When the physical layer devices 504 operate in 10 Mbps mode, they clock the transmit data with their TX_CLK signal. Therefore, four 10 Mbps TX serializers 1428 are provided. Each of the four 10 Mbps TX serializers 1428 receives the output data of the TX FIFOs 1426 and a corresponding one of the four transmit clock signals TX_CLK1–4 from respective physical layer devices 504. The output of each of the four TX serializers 1428 is provided to the other input of a respective one of the MUXs 1410–1416 for the respective ports. When the TX serializer 1428 detects valid data in the TX FIFO 1426 and a corresponding PDO1–4 signal is active, it provides corresponding TXD<3:0> data and TX_EN signals of TXPORT1–4 to the corresponding physical layer circuit 504 via the corresponding one of the MUXs 1410–1416. The TX_EN signals are generated by a corresponding TX serializer 1428 based on the valid flag bits, where the TX_EN signals remain asserted for each valid data bit. The TX serializer 1428 cycles through the TX FIFO 1426 and clocks data to the corresponding physical layer device 504 for each data that has its valid flag bit set. The respective 10 MHz TX_CLK signals provided from the physical layer devices 504 are used to clock the data into respective physical layer circuits 504. The TX serializer 1428 completes the transmission process when it detects an invalid flag, where it then deasserts a respective TX_EN signal.

One bit of data is written to the TX FIFO 1426 for every two cycles of the CLK20 signal. One bit of data is written by a TX serializer 1428 for every clock cycle of the corresponding TX_CLK1–4 signal provided by the corresponding physical layer circuit 504. Ideally, if the CLK20 and TX_CLK1–4 signals were synchronized and did not vary with respect to each other, only one data bit would be needed in the TX FIFO 1426. However, the CLK20 and TX_CLK1–4 signals are not necessarily in phase and further may have frequencies that vary with respect to each other in the embodiment shown. A 10 Mbps data rate represents a bit rate of approximately 100 nanoseconds (ns). Ethernet packets have a maximum of 1,518 bytes or 12,144 bits. Given the variation between the two clock signals, the Manchester decoder 1424 and the TX serializer 1428 may vary by 1–2 bits with respect to each other for a given packet. The TX serializer 1428 waits for at least 3–4 bits written to the TX FIFO 1426 by the Manchester decoder 1424 before pulling data from the TX FIFO 1426 to ensure that data is not lost. The TX FIFO 1426, therefore, is seven data bits deep to ensure that data is not lost if either side is faster or slower by 1–2 bits than the other side.

The four sets of RXPORT1–4 signals are provided to respective inputs of a 4-to -1 MUX 1430, which provides a selected set of RXPORT signals, shown as RXPORT10, to the input of a 6×2 (6 bits deep by 2 bits wide) configured RX FIFO 1432. The 6×2 configuration includes a valid flag bit for each data bit in a similar manner as described above for the TX FIFO 1426. The select input of the MUX 1430 is controlled by the SLNK and PCRS signals to select the active port. As soon as a respective RX_DV1–4 signal is detected by the RX FIFO 1432 from the MUX 1430, the RX FIFO 1432 writes the RXD<0> data using the falling edge of the corresponding 10 MHz RX_CLK to ensure proper setup and hold times. The RX FIFO 1432 sets a corresponding valid flag bit for each valid data bit in a similar manner as described above for the TX FIFO 1426. Once the first data bit is written into the RX FIFO 1432, it sets the valid flag bit to notify a 10 Mbps Manchester encoder 1434 to receive and encode the data and to provide encoded data to the repeater module 512 on a respective one of the four PDI1–4 signals. The Manchester encoder 1434 performs the reverse process as the Manchester decoder 1424 to convert NRZ formatted data to Manchester encoded data for the repeater module 512.

The Manchester encoder 1434 cycles through the RX FIFO 1432 until it detects an invalid flag indicating the end of the packet. If any of the respective four physical layer devices 504 detects a collision, it asserts a respective one of the COL1–4 signals provided to the Manchester encoder 1434, which respondingly drives a 10 MHz clock signal on a respective one of the four PCI1–4 signals. In the event of a collision, the RX FIFO 1432 is held in reset until the PCRS1–4 carrier sense and RX_DV1–4 signals are deasserted. The Manchester encoder 1434 ignores data in the RX FIFO 1432 in the event of collision and continues to send a data bit "1" to the repeater module 512 until the respective PCRS1–4 carrier sense signal is deasserted. The repeater module 512 sends an alternating jam pattern (10101 . . . ) until its receiving port goes idle. Thus, valid encoded data is present on corresponding PDI1–4 signals only for those ports that have a corresponding valid LINK1–4 signal and PCRS1–4 carrier sense signal asserted.

In a similar manner as described above for the TX FIFO 1426, the 10 MHz RX_CLK signals provided through the MUX 1430 are not in phase with the CLK20 signal, and the frequencies may vary significantly with respect to each other. This is especially true since each of the RX_CLK signals are passed through the logic of the MUX 1430. Thus, the MUX 1430 and the Manchester encoder 1434 may vary by up to 2–3 bits for a full Ethernet packet. When the Manchester encoder 1434 detects first valid data in the RX FIFO 1432, it waits at least one bit-time or approximately 100 ns and then begins to encode the NRZ formatted data in the RX FIFO 1432 to Manchester format, and writes the data to the DI1–4 signals. The delay is between 3–4 bit times or 300–400 ns before encoding is completed. The RX FIFO 1432 includes 6 bits to ensure that data is not lost in the event either side is faster or slower by 2–3 bits with respect to each other for a given packet.

The repeater module 512 includes an internal memory 505 for storing statistics of each port via the port connectors 502 operating at 10 Mbps. In particular, the repeater module 512 tracks, updates and maintains each of several statistics for each port coupled to a 10 Mbps device and stores the statistics in the memory 505. The repeater module 514 is coupled via a management bus 550, described below, to a memory 519 for storing statistics of each port via the port connectors 502 coupled to and operating at 100 Mbps. The repeater module 514 tracks, updates and maintains each of several statistics for each port coupled to a 100 Mbps device and stores the statistics in the memory 519. The types of statistics stored include the number of readable frames, readable octets, collisions, short events, runt frames, very long events, frames too long, late events, frame check sequence (FCS) errors, frame alignment errors, data rate mismatches, total errors, last source address, source address changes, auto-partitions, dropped events, coding errors, isolates, etc. Of course, this list is not intended to be exhaustive as many other types of statistics may be tracked and stored as desired. Also, as further described below, similar statistics are tracked at the repeater level and unit level. Although each repeater module 512, 514 includes a separate memory device, it is understood that a single memory device could be used instead.

A switch device module 516 corresponds to each of the switching devices 102c–110c, and is preferably the Macronix MX98201 10/100 self-learning bridge. The switch device module 516 includes a 100 Mbps port coupled to an MII MAC port of a 100 Mbps repeater module 514 and a 10 Mbps port coupled to a Reversible-AUI (RAUI) port of the 10 Mbps repeater module 512 through an ENDEC (Encoder/Decoder). The switch device module 516 is preferably coupled to a 256-Kbyte packet buffer memory 518 for both 10 and 100 packet data. The packet buffer memory 518 is split between 100 and 10 Mbps segments at a default of 15:1 ratio, but is programmable to a 7:1 ratio. Broadcast and multicast packets are forwarded in both directions but may be blocked using MIB objects. The switch device module 516 is further coupled to a CAM (Content-Addressable Memory) device 520 via a CAM controller 522. The CAM device 520 is used to store a MAC address table with up to 511 or 1023 MAC address entries and to perform address lookup. In an unmanaged stack configuration, CAM entries are automatically flushed or cleared when the CAM device 520 becomes full when another new address is received. In a managed stack configuration, the management agent 1302 has the option to flush the CAM device 520 when full or not. The CAM controller 522 is preferably an FPGA design that interfaces the switch device module 516 to the CAM device 520.

The CAM controller 522 captures source and destination MAC addresses from a packet data bus of the switch device module 516. The source addresses (SA) are used for learning and purging purposes and the destination addresses (DA) are used for filtering purposes. Preferably, only SAs from the 10 Mbps segment are learned; SAs from the 100 Mbps segment are not learned. In particular, a SA of a packet from the 10 Mbps segment invokes a learning task for storing the SA if not already stored, and an SA of a packet from the 100 Mbps segment invokes a purging task. For example, if the SA from a 100 Mbps packet matches an entry in the CAM device 520, the entry is purged since it is no longer on the 10 Mbps segment. If a DA from a packet from the 10 Mbps segment matches an entry in the CAM device 520, the packet is local and not forwarded to the 100 Mbps segment. Otherwise, the CAM controller 522 indicates to the switch device module 516 to forward the packet to the 100 Mbps segment. If a DA from a 100 Mbps packet matches an entry in the CAM device 520, the switch device module 516 forwards the packet to the 10 Mbps segment. Otherwise, the 100 Mbps packet is not forwarded to the 10 Mbps segment.

The management bus 550, which includes control, address and data signals, is coupled to the 10 and 100 Mbps repeater modules 512, 514, the switch device module 516, the CAM controller 522 and the MIC 510. The management bus 550 is also coupled to the four backplane connectors 304 via the daughter board expansion connector 314, the backplane board connector 310 and sets of transceivers 545, 546 and 547, respectively, for coupling to the management portion 112b of the backplane bus 112. The MIC 510 is further coupled to an Electrically Erasable Programmable ROM (EEPROM) 524 and to a Non-Volatile RAM (NVRAM) 526, and interfaces to the daughter board connector 314. The MIC 510 generally provides management access to the various resources and modules of the repeater 102 via the management bus 550. A COM port connector 530 including RS-232 connections to the daughter board connector 314 provides the serial port 114 for basic out-of-band management and configuration functions. The serial port 114 is used for several purposes, including pre-boot Power On Self Test (POST) messages, boot messages, VT100 emulated terminal management via direct connection, SNMP and Telnet management via SLIP, firmware update via XMODEM transfer, etc. The serial port 114 may thus be used for "out-of-band" management purposes for interfacing a management console via the management platform 116. Management is typically performed "in-band", however, via any one of the ports of the repeaters 102–110.

A 100M local arbiter 515 is coupled between the repeater module 514 and the daughter board connector 314 for arbitrating access between the 100 Mbps segments of the repeater modules 514 and 614. A 10M local arbiter 517 is coupled between the repeater module 512 and the daughter board connector 314 for arbitrating access between 10 Mbps segments of the repeater modules 512 and 612. A 100M global arbiter 521 located on the backplane board 302 is coupled via the backplane connector 310 and to each of the expansion connectors 304 for arbitrating all of the 100 Mbps segments of the repeaters 102–110.

The TX BUS is provided for transmitting information and data from the repeater module 514 to any one or more of the ARICs 506 and to the SUM 402, if provided, and thus to any network devices coupled to the ports PORT 1–PORT 12 operating at 100 Mbps. The RX BUS receives information and data from any one or more of the ARICs 506, the SUM 402 if present, and also from any other repeaters coupled via the repeater portion 112a of the backplane bus 112, where the information and data is provided to the repeater module 514. The RX BUS is coupled to a 100 Mbps expansion bus 540 through transceiver 542. The expansion bus 540 is coupled through the daughter board connector 314 and the backplane board connector 310 to four sets of transceivers 544. Each of the transceivers 544 is coupled to a corresponding one of the backplane connectors 304 for coupling to the repeater portion 112a of the backplane bus 112. As described previously, the backplane connectors 304 are coupled to other repeaters, such as the repeaters 104–110, via corresponding cables 306 forming the physical embodiment of the repeater portion 112a of the backplane bus 112. In this manner, the repeater module 514 is coupled to the backplane bus 112 and is part of a single 100 Mbps collision domain between the repeaters 102–110.

Figure 6:
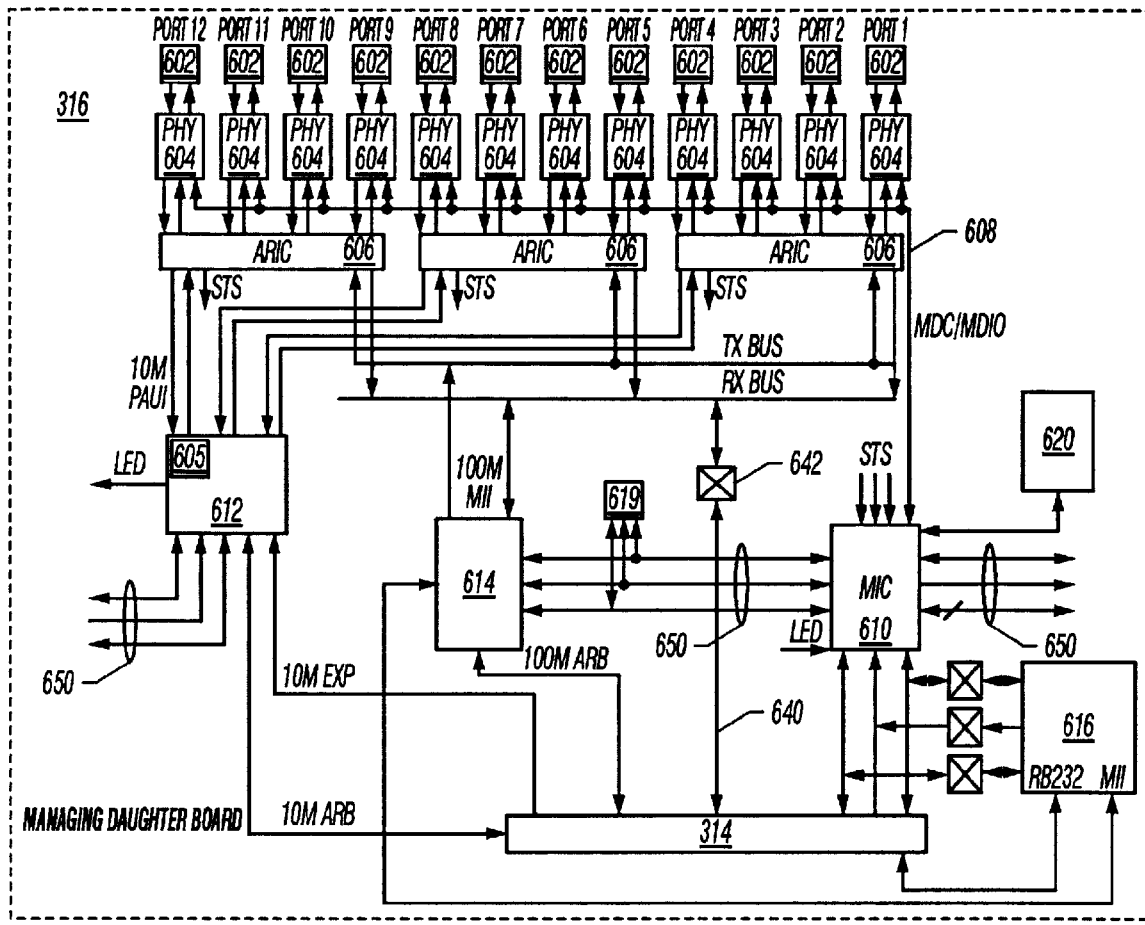
FIG. 6 is a more detailed exemplary block diagram of a daughter board of the managing repeater of FIG. 1A.

FIG. 6 is a more detailed block diagram of the daughter board 316 of the managing repeater 102. The daughter board 316 also includes twelve port connectors 602 coupled to PHY devices 604, which are further coupled to three ARICs 606 in a similar manner as described above for the managing base board 312. The ARICs 606 are preferably implemented in a similar manner as the ARICs 506, described above. The twelve ports are also labeled PORT 1–PORT 12 on the daughter board 316, although these ports are remapped as ports PORT 13–PORT 24 on the repeater. The PHY devices 604 are further coupled to another MIC 610 via another MDC/MDIO bus 608, and the ARICs 606 are each coupled to another 10 Mbps repeater module 612 and another 100 Mbps repeater module 614 on the daughter board 316. The repeater modules 612, 614 are configured in a similar manner as the repeater modules 512, 514, respectively. The repeater module 612 tracks 10 Mbps statistics of the ports via the port connectors 602 when operating at 10 Mbps and includes an internal memory 605 for storing the 10 Mbps statistics in a similar manner as described above for the repeater module 512 and the memory 505. Also, the repeater module 614 tracks 100 Mbps statistics of the ports via port connectors 602 when operating at 100 Mbps. The repeater module 614 is coupled to a memory 619 via a management bus 650 for storing the 100 Mbps statistics in a similar manner as described above for the repeater module 514 and the memory 519. Although each repeater module 612, 614 includes a separate memory device, it is understood that a single memory device could be used instead. Further, a single memory device may be used rather than all of the memories 505, 605, 519 and 619 as desired.

The MIC 610 is coupled to another EEPROM 620 and to the 10 and 100 Mbps repeater modules 612, 614 via the management bus 650 on the daughter board 316 in a similar manner as previously described. The management bus 650 is an extension of the management bus 550 on the managing base board 312 through the daughter board connectors. The management buses 550, 650, 750 and 850, described below, and the management portion of the backplane bus 112b are all part of and extensions of a general management bus 1300 (FIG. 13) of the network system 100. The management bus 1300 is also extended via the MICs 510, 610 and similar MICs 710 and 810, described below. It is noted that the daughter board 316 does not include another switch device module 516. Instead, the 10 and 100 repeater modules 612, 614 are coupled to the switch device module 516 on the managing base board 312 via the repeater modules 512, 514 on the base board 312 and the daughter board connector 314. The Reverse MII (RMII) MAC port of the 100 Mbps repeater module 614 is coupled to a 100 Mbps MAC device in the management engine 616. The management engine 616 includes an RS-232 port for interfacing RS-232 signals of the serial port 114 via daughter board connector 314.

The daughter board 316 includes another TX BUS for enabling the repeater module 614 to transmit information and data to the ARICs 606 and thus to the ports PORT 13–PORT 24. The daughter board 316 further includes another RX BUS coupled between the repeater module 614, the ARICs 606 and a 100 Mbps expansion bus 640 via transceiver 642. The RX BUS of the daughter board 316 is thus an extension of the RX BUS of the base board 312 of the managing repeater 102. The expansion bus 640 is coupled to the expansion bus 540 via the daughter board connector 314. In this manner, data and information transmitted to the repeater 102 via the network portion 112a of the backplane bus 112 is provided to the repeater module 614 in a similar manner as described above for the RX BUS of the repeater module 514.

Figure 7:
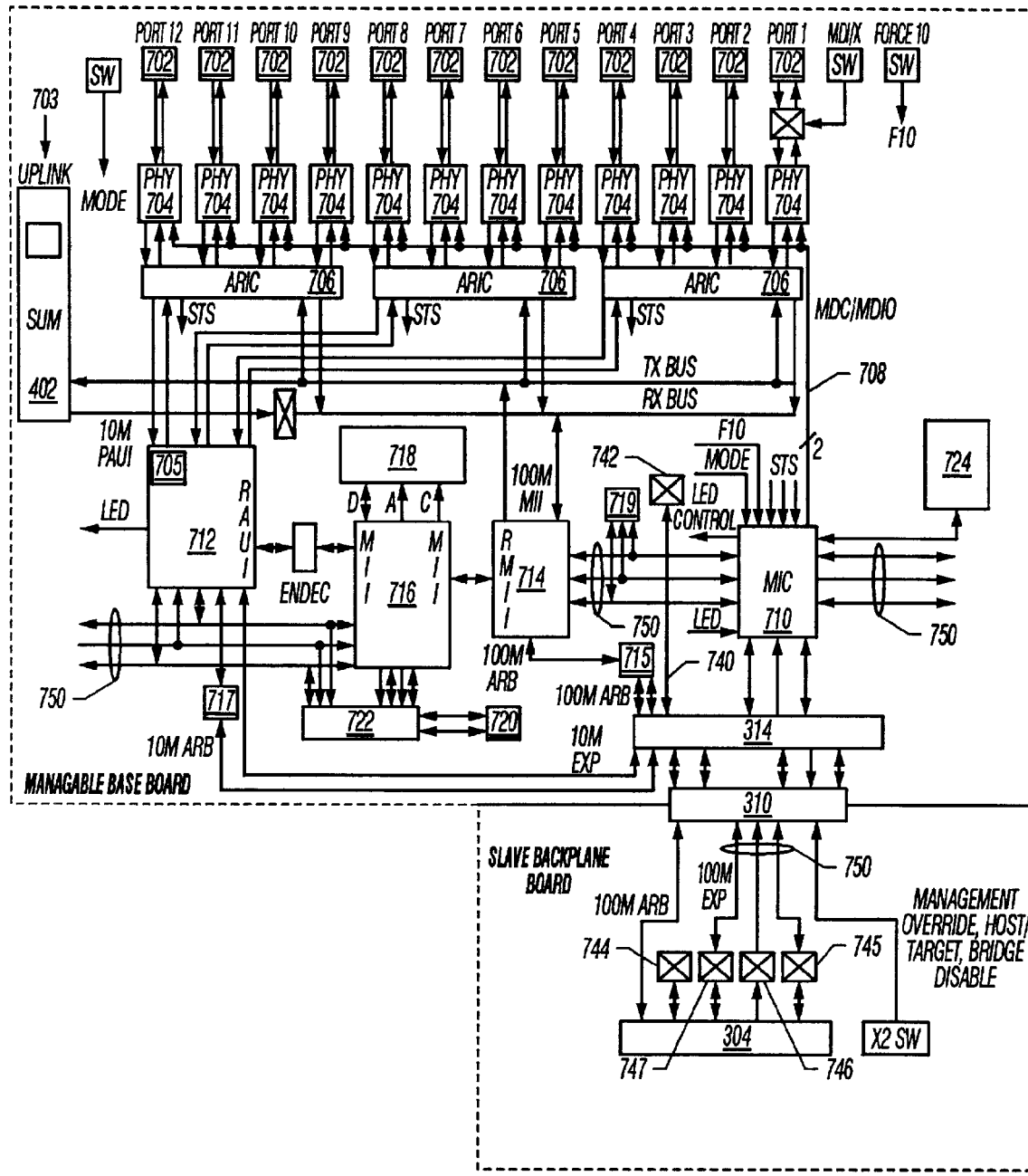
FIG. 7 is a more detailed exemplary block diagram of a manageable base board and a slave backplane board of a manageable repeater of FIG. 1A.

FIG. 7 is a more detailed exemplary block diagram of the "manageable" base board and the "slave" backplane board of a manageable repeater, such as any one of the repeaters 104–110. The base board of a manageable base board is similar to that of a managing base board excluding the NVRAM 526. The slave backplane board of a manageable repeater includes only one backplane connector 304. The manageable base board includes a similar RX BUS that is expanded via the slave backplane board to the expansion connector 304 via transceivers 744 in a similar manner as described above for the managing base board shown in FIG. 5 via transceivers 544. Thus, the RX BUS of a manageable repeater is extendable to other repeaters via the repeater portion 112a of the backplane bus 112. Also, the management bus control, address and data signals of the management portion 112b of the backplane bus 112 are coupled to the local MICs 710, 810 of the manageable base board and an "unmanaged" daughter board via transceivers 745, 746 and 747, respectively, and a management bus 750. The management bus 750 is considered an extension of the management bus 1300 of the managing repeater 102 in a stacked configuration via the management portion 112b of the backplane bus 112. A 100M local arbiter 715 is coupled between the repeater module 714 and the daughter board connector for arbitrating access between 100 Mbps ports of the repeater modules 714 and 814.

The repeater modules 712, 714 are configured in a similar manner as the repeater modules 512, 514, respectively. The repeater module 712 tracks 10 Mbps statistics of associated ports via port connectors 702 when operating at 10 Mbps and includes an internal memory 705 for storing the 10 Mbps statistics in a similar manner as described above for the repeater module 512 and the memory 505. Also, the repeater module 714 tracks 100 Mbps statistics of the ports via the port connectors 702 when operating at 100 Mbps. The repeater module 714 is coupled to a memory 719 via the management bus 750 for storing the 100 Mbps statistics in a similar manner as described above for the repeater module 514 and the memory 519.

Figure 8:
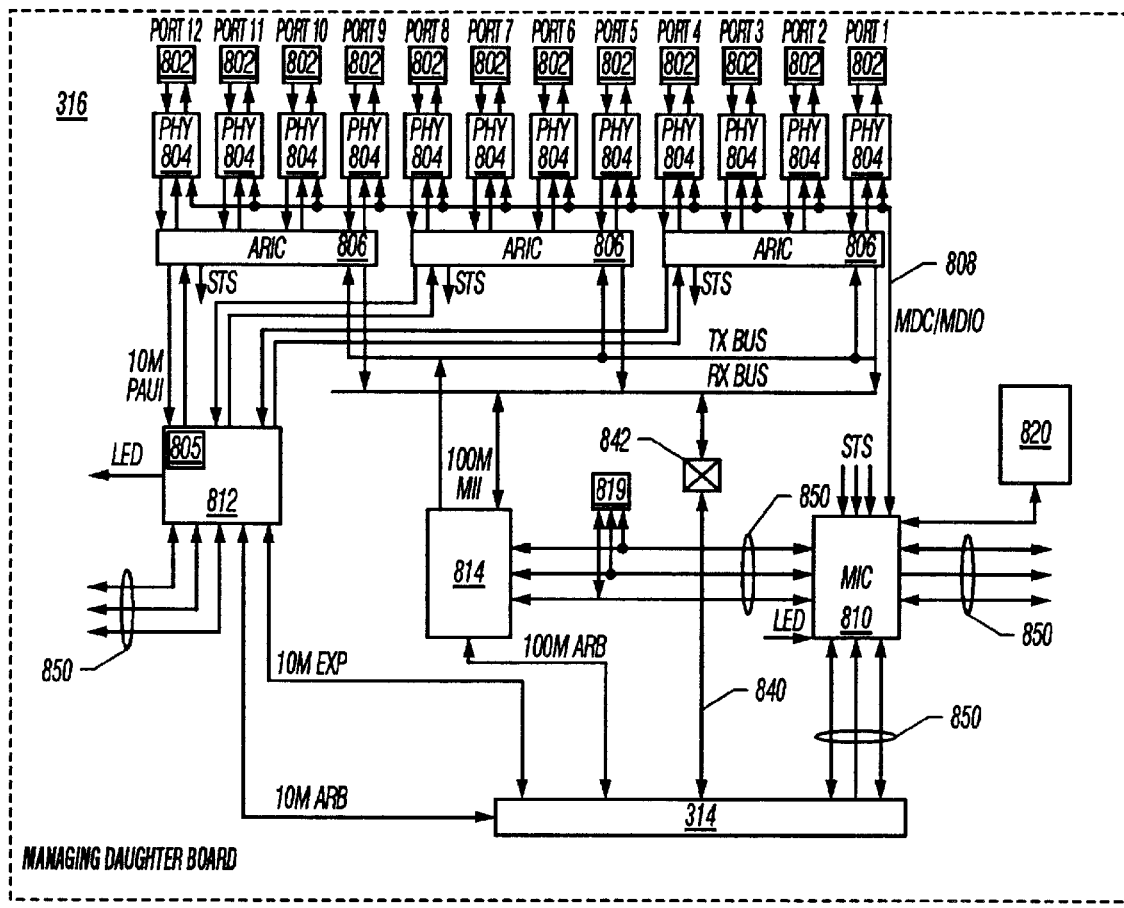
FIG. 8 is a more detailed exemplary block diagram of an unmanaged daughter board of a manageable repeater of FIG. 1A.

FIG. 8 is a more detailed exemplary block diagram of the unmanaged daughter board of a manageable repeater, such as any one of the repeaters 104–110. An unmanaged daughter board is similar to a managing one except excluding the management engine 616 and corresponding management functions. The unmanaged daughter board also includes an RX BUS expanded to the RX BUS of the manageable base board of each manageable repeater via another daughter board connector via transceiver 842. In this manner, the 100 Mbps segments of the unmanaged daughter boards of the repeaters 104–110 are coupled to each other and to the 100 Mbps segment of the managing repeater 102 in the same collision domain via the repeater portion 112a of the backplane bus 112. The control, address and data signals of the management portion 112b of the backplane bus 112 are coupled to the MIC 810 via a daughter board connector and a corresponding extension management bus 850 in a similar manner as described previously for the managing repeater 102.

The repeater modules 812, 814 are configured in a similar manner as the repeater modules 512, 514, respectively. The repeater module 812 tracks 10 Mbps statistics of associated ports via port connectors 802 when operating at 10 Mbps and includes an internal memory 805 for storing the 10 Mbps statistics in a similar manner as described above for the repeater module 512 and the memory 505. Also, the repeater module 814 tracks 100 Mbps statistics of the ports via port connectors 802 when operating at 100 Mbps. The repeater module 814 is coupled to a memory 819 via the management bus 850 for storing the 100 Mbps statistics in a similar manner as described above for the repeater module 514 and the memory 519.

Each of the manageable units 104–110 includes an external MASTER/TARGET switch to reverse the sense of backplane arbitration. In a managed stack configuration including a managing unit, such as the repeater 102, the MASTER/TARGET switch of each of the manageable repeaters 104–110 is set to TARGET. Two manageable units, such as repeaters 104 and 106, may be coupled together with a single cable 306 coupling the backplane connectors 304 forming an unmanaged stack configuration. The MASTER/TARGET switch of one of the manageable units in the unmanaged stack configuration is set to MASTER and the other is set to TARGET. Setting the MASTER/TARGET switch to MASTER effectively enables the 100M arbiter 715 of one of the manageable units, whereas setting the MASTER/TARGET switch to TARGET disables the 100M arbiter 715 of the other unit. Thus, only one of the manageable units performs backplane arbitration in the unmanaged stack configuration.

Figure 9:
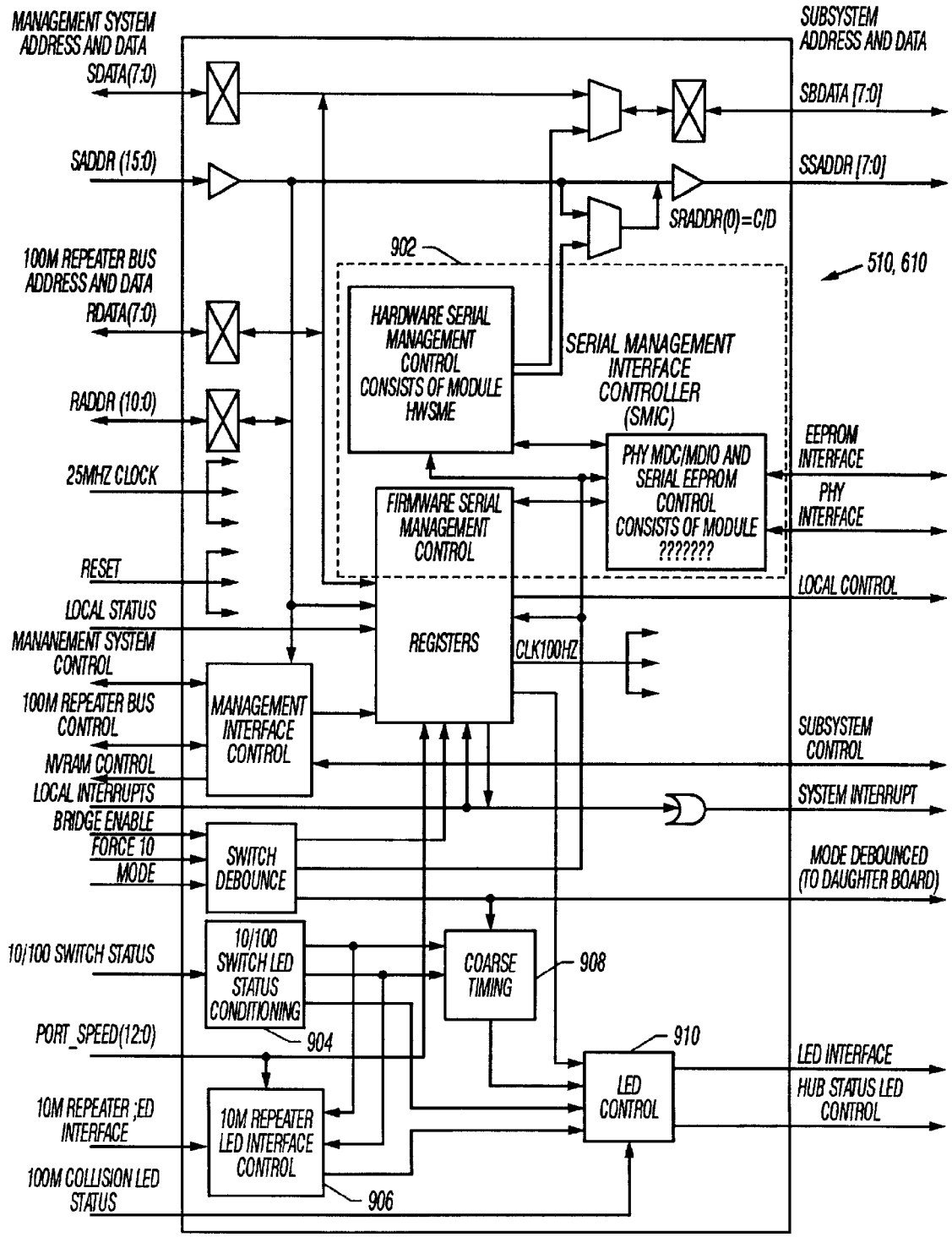
FIG. 9 is a more detailed and exemplary block diagram of the WMIC of FIGS. 5–8.

FIG. 9 is a more detailed block diagram of both of the MICs 510 and 610, where each of the MICs 510, 610, 710 and 810 are similar to each other for both the managing and manageable repeaters. The MIC 510 is briefly described herein and the description is similarly applicable to the MICs 610, 710 and 810. The MIC 510 includes a Serial Management Interface Controller (SMIC) 902, which provides control of base and daughter board PHY devices through MII SMIC to PHY device registers. The SMIC 902 also provides for non-volatile storage of up to eight register values per PHY device in serial EEPROM with an additional eight register values available for broadcasts. The MIC 510 further includes status and control logic for Light Emitting Diodes (LEDs) provided on each of the repeaters 102–110. For example, the MIC 510 includes 10/100 switch LED status conditioning logic 904, 10M repeater LED interface control logic 906, timing circuitry 908 and LED control logic 910. Many other logic, circuits and components are provided on the MICs 510, 610.

Figure 10:
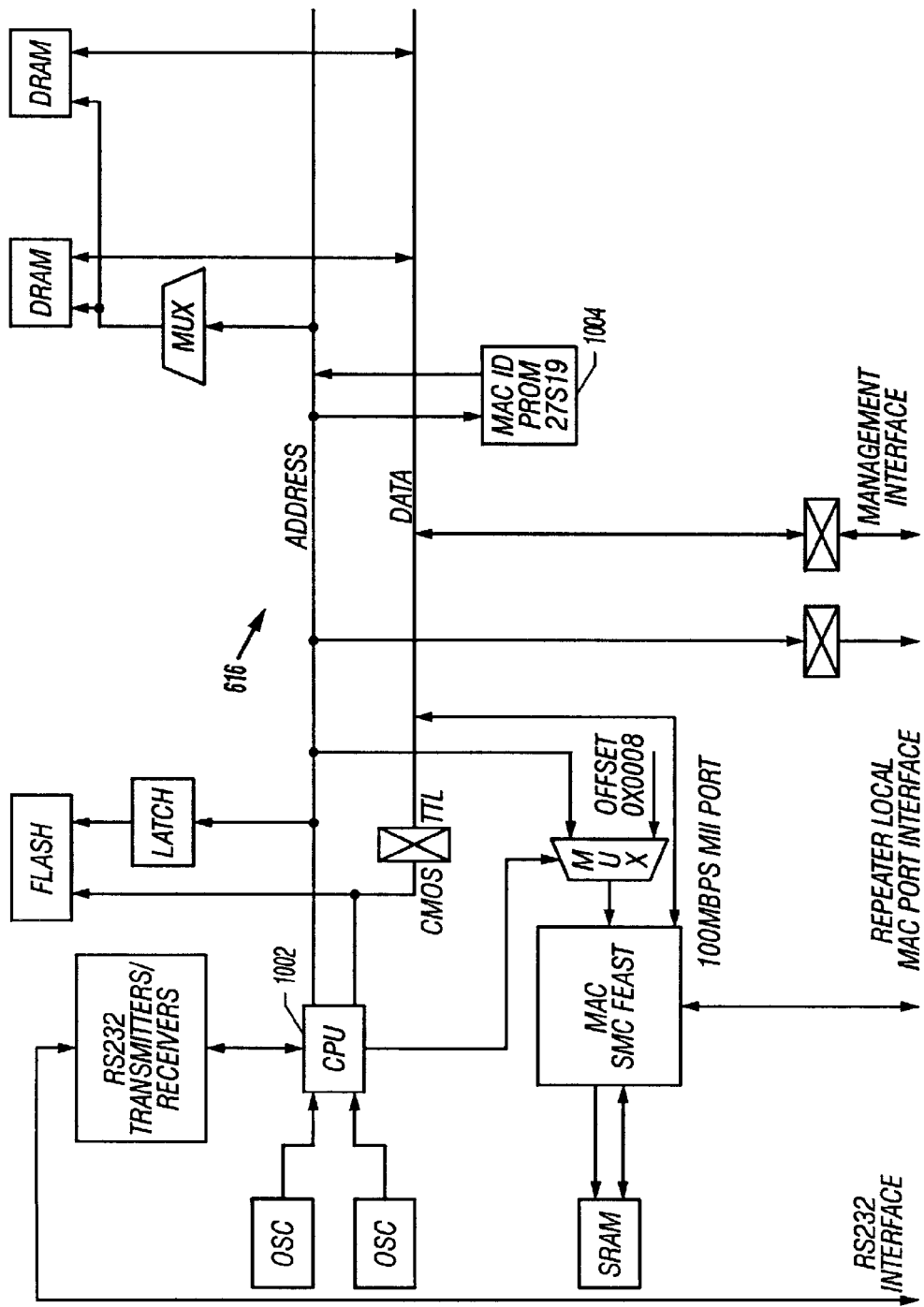
FIG. 10 is a more detailed block diagram of the management engine of FIG. 6.

FIG. 10 is a more detailed block diagram of the management engine 616 of the repeater 102. The primary module on the management engine 616 is a processor 1002, which is preferably an 80386 EX central processing unit (CPU) by Intel. The management engine 616 preferably includes a MAC identification (ID) memory device 1004 that stores the MAC address for the managing repeater 102. The single MAC address is used by the management agent 1302 (FIG. 13) in a managed stack configuration as the physical address for the MAC device for in-band management communications. The management engine 616 is coupled to the management bus 1300 of the network system 100 via the management buses 650 and 550 and the management portion 112b of the backplane bus 112 as previously described. In this manner, the management engine 616 provides management functions for all of the repeaters 102–110 of the network system 100.

Figure 11:
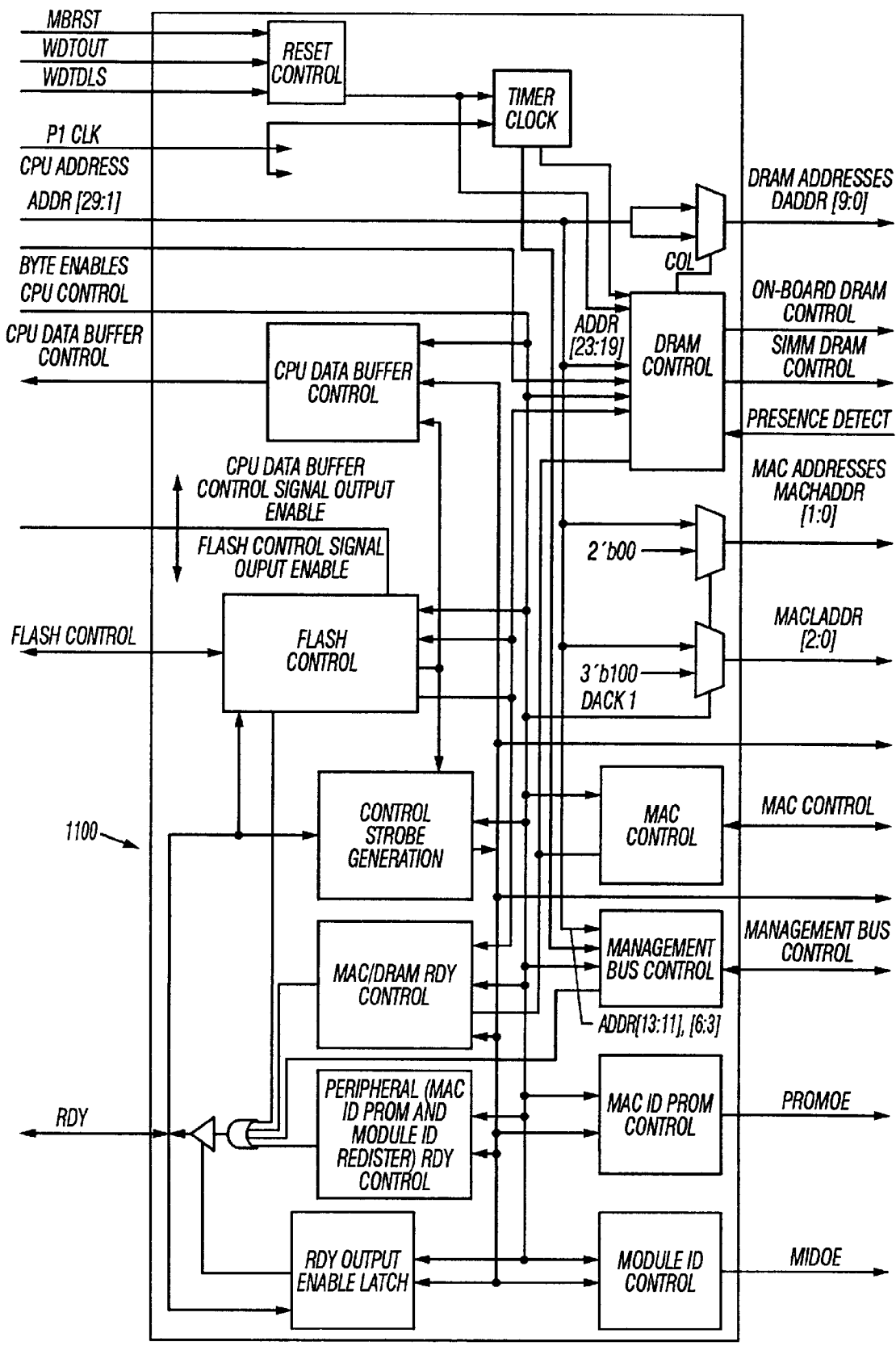
FIG. 11 is a block diagram of an exemplary management engine controller used in the management engine of FIG. 10.

Although not shown in FIG. 10, the management engine 616 includes a Management Engine Controller (MEC) 1100. FIG. 11 is a block diagram of the MEC 1100. Many other logic, circuits and components are provided on the management engine 616 and the MEC 1100 but they are not described as they are not necessary for a full understanding of the present invention.

Figure 12:
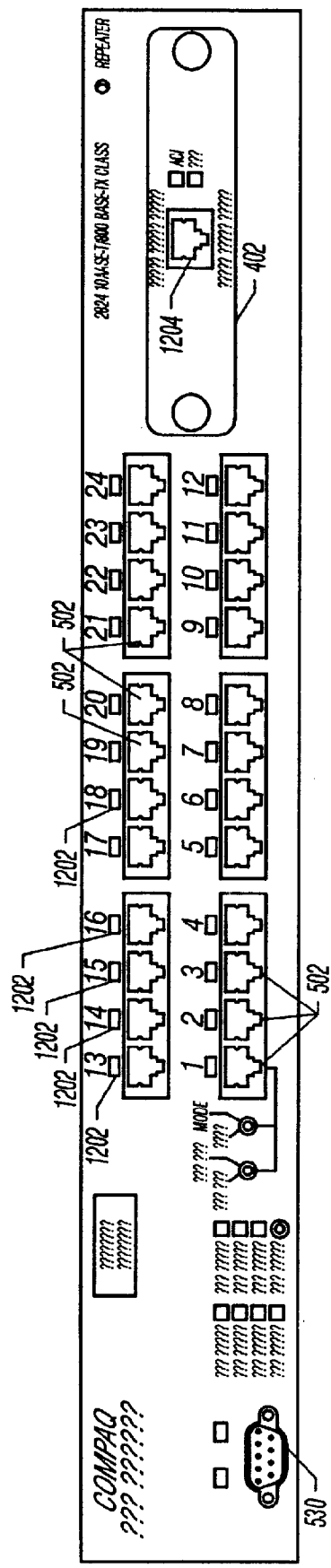
FIG. 12 is a front view of the physical housing of the managing repeater of FIG. 1A.

FIG. 12 is a front view of the face plate of the physical housing of a managing repeater, such as the repeater 102.

The 24 port connectors 502 for each of the ports PORT 1–PORT 24 are shown in two rows of twelve, twelve each for the base and daughter boards previously described. Each port includes a status LED 1202 above the corresponding port connector. Each of the LEDs 1202 provide LINK status, activity status or whether the port is partitioned or disabled. The COM port connector 530 is shown along with an RJ-45 connector 1204 for the uplink port 503. A POWER LED indicates whether power supply 404 is providing power to the repeater, and a STATUS LED indicates the general status of the repeater. One or more failure or fault conditions are indicated by the color (green or yellow) and flash frequency (blinking or not) of the STATUS LED. Further details are provided in Appendix A.

A 10 COL LED indicates collisions on the 10 Mbps segment and a 100 COL LED indicates collisions on the 100 Mbps segment. A 10/100 SW LED indicates whether the internal switch device module 516 is enabled or disabled and also indicates the operation status of the switch device module 516. A 100 BP LED indicates connection to or isolation from a common 100 Mbps backplane, such as the repeater portion 112a of the backplane bus 112. A 10MB LED indicates that the mode and status of the ports operating at 10 Mbps are displayed by the LEDs 1202 of the respective ports operating at 10 Mbps. In particular, if the 10MB LED is on or green, then the LEDs 1202 display the status of 10 Mbps connections. The LEDs 1202 of those ports either not connected or not operating at 10 Mbps remain off. A 100MB LED indicates that the mode and status of the ports operating at 100 Mbps are displayed by the LEDs 1202 of the ports operating at 100 Mbps. In particular, if the 100MB LED is on or green, then the LEDs 1202 display the status of 100 Mbps connections. An ALT LED indicates an alternating mode, where the 10MB LED and 100MB LED are alternately turned on and off to alternately indicate the status of the 10 and 100 Mbps ports.

An ACT LED on the SUM 402 indicates whether link is active and whether there is activity on the uplink port 503. A COL LED on the SUM 402 indicates collisions on the uplink port 503 or whether the SUM 402 and uplink port 503 are disabled.

Several switches are also provided on the front panel. A push button MODE switch is used for display mode to force either the 10, 100 or alternating display modes described above. A 10/100 10 ONLY rotary switch is used to switch the first port, PORT 1, into either 10/100 or force 10 Mbps mode. When set to 10 ONLY, PORT 1 is forced to operate only at 10 Mbps and when set to 10/100 , PORT 1 allows auto-negotiation to either 10 or 100 Mbps just like the other ports. An MDIX/MDI rotary switch configures the port for MDIX or MDI pinouts for switching the TX and RX signals. When set to MDIX, PORT 1 uses the MDIX pinout and may be connected directly to a NIC. When set to MDI, PORT 1 uses the MDI pinout so that PORT 1 may be used as a 10 Mbps uplink port. The face plate of a manageable repeater, such as the manageable repeaters 104–110, is similar to that shown in FIG. 12, except excluding the COM port connector 530.

Figure 13:
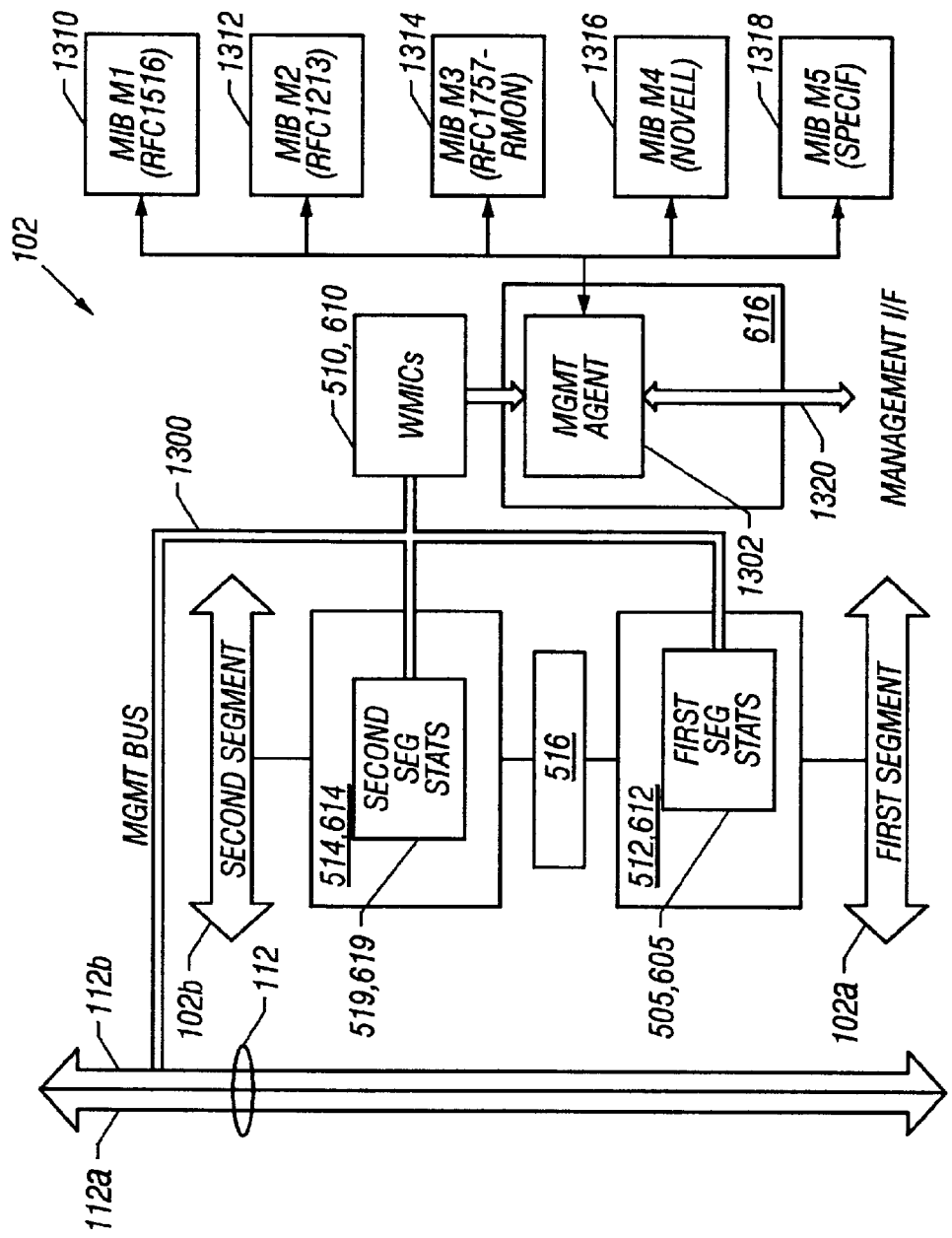
FIG. 13 is a block diagram of the managing repeater of FIG. 1A illustrating a management agent, a management bus, management databases and other management functions.

Referring now to FIG. 13, a block diagram is shown of the managing repeater 102 illustrating the management agent 1302, the management bus 1300 and management functions. FIG. 13 shows, in simplified form, the first segment 102a and the memories 505, 605 of the repeater modules 512, 612, the second segment 102b and the memories 519, 619 of the repeater modules 514, 614, and the switch device module 516 coupled between the repeater modules 512 and 514. The management agent 1302 accesses the 10 and 100 repeater modules 512, 514, 612 and 614 and their corresponding memories 505, 519, 605 and 619 for purposes of management and control via the management bus 1300 and the MICs 510, 610. The management agent 1302 further accesses the 10 and 100 repeater modules 712, 714 and 812, 814 and their corresponding memories 705, 719, 805 and 819 of each of the manageable repeaters 104–110 included in the stack via the management bus 1300. As described previously, the management bus 1300 couples the management buses 550, 650, 750 and 850, the MICs 510, 610, 710 and 810, the transceivers 545, 546 and 547 and corresponding transceivers 745, 746 and 747 and the management portion 112b of the backplane bus 112. In this manner, the management agent 1302 has access to all of the segments 102a–110a and 102b–110b of the network system 100 via the management bus 1300. Furthermore, the management platform 116 is able to monitor and manage the network system 100 including all nodes coupled thereto, if desired.

The management agent 1302 manages and controls each of the ports of each of the repeaters 102–110 in the network system 100 in a unified manner. Unified treatment occurs even though each port of any given repeater may operate at 10 Mbps when coupled to the first segment and at 100 Mbps when coupled to the second segment. This enables an external managing device, such as a management console of the management platform 116, to manage each of the ports in a unified manner regardless of the particular protocol or transmission rate and regardless of whether in-band or out-of-band. As further described below, statistics are gathered for each port when operating at either transmission rate. In response to a "unified" statistics request, a unified statistic is provided that reflects combined operation at both transmission rates. The statistics request may specify transmission rate, in which case the management agent 1302 provides statistics specific to the requested transmission rate rather than a unified statistic. As further described below, port intrusion detection and/or intrusion prevention is supported in a unified manner. If an unauthorized node or station attempts to transmit to a port, that port is shut down regardless of the media standard or transmission rate of the intruder or of a subsequent network device. Such unified management enables the management unit to manage or control all of the ports of the network system in a unified manner regardless of transmission rate or media standard.

The management agent 1302 is preferably implemented as firmware stored in memory within the management engine 616, such as a ROM, FLASH ROM, etc., and executed by a local processor, such as the processor 1002. The management agent 1302 accesses, controls and maintains at least one MIB, which is a database containing information about the elements to be managed in the network system 100. A MIB is a definition of a structured collection of objects representing one or more nodes, devices, resources, etc. of a network to be managed, controller or otherwise monitored. The objects in a MIB are ordered in a hierarchical tree structure, typically defined with the ASN.1 (Abstract Syntax Notation one) standard, which is a formal language for defining abstract syntax of application data. Several standardized MIBs are known, including MIB-I, MIB-II, Host MIB, Bridge MIB, Hub MIB, RMON MIB, among others. Each of the resources or network devices, such as computer systems or nodes, switches, routers, brouters, bridges, repeaters, hubs, etc. in a network may have a standard and/or enterprise-specific MIB(s) for management purposes.

The repeaters 102–110 and the management agent 1302 support several MIBs, including the standard Ethernet™ Repeater MIB (M1) 1310 implemented according to RFC 1516, the MIB II (M2) 1312 implemented according to RFC 1213, the Remote Network Monitoring (RMON) MIB (M3) 1314 implemented according to RFC 1757, the EtheMet™ Hub MIB by Novell (M4) 1316 and at least one enterprise specific MIB (M5) 1318, which is a private MIB designed specifically for the network system 100. The repeater 102 and the management agent 1302 may also support other standard or non-standard MIBs designed for the network system 100.

Each of the objects in the MIBs M1–M5 is accessed or otherwise referenced using a corresponding object identifier (OID), which comprises a sequence of integers for traversing the successive nodes of the tree structure. Each object has a syntax type, which, by the SMI (Structure of Management Information) convention, is the universal class including integers, octet string, null, object identifier and sequence. Other allowable data types are defined, including IpAddress, Counter32, Gauge32, TimeTicks, Opaque, Counter64 and Unsigned32. The SMI identifies the data types that may be used in a MIB and how resources are represented and named in that MIB. There may be multiple instances of an object. Each object instance also has a value. For example, an object of type "integer" may have a value of 9. Each object or a set of objects defines the status and characteristics of a network resource. A resource manager or management console, such as within the management platform 116, monitors the status of the resources by reading the values of the objects and controls the resources by changing the values of the objects via a management agent, such as the management agent 1302. The management information includes control, status, statistics, security, identification, etc. and information, such as packet counts, error counters, time counters, IpAddresses, etc.

The management platform 116 monitors and manages the network system 100 by sending SNMP requests or the like to the management agent 1302 via a management interface (I/F) 1320, where the management agent 1302 accesses one or more of the MIBs M1–M5 to retrieve or modify MIB objects, or to otherwise retrieve information associated with MIB objects. The management I/F 1320 is any one of the ports of the repeaters 102–110 for in-band management or the serial port 114 for out-of-band management. Each SNMP request includes one or more OIDs to the objects in the MIB of interest. For example, the management platform 116 sends a "GET", "GETNEXT" or "SET" operation with a corresponding OID to the management agent 1302, which accesses one or more of the MIBs M1–M5 and responds by reading or modifying information corresponding to one or more objects identified by the OIDs in the MIBs according to the specific operation. The GET operation is used to read a value corresponding to an object identified by an OID and the GETNEXT operation is used to read a value corresponding to the next object or "leaf" in the MIB tree referenced by a given OID. The SET operation is used to modify a value corresponding to an object identified by an OID. A "TRAP" operation is similar to an interrupt, where if an object or the value corresponding to an object changes, the management agent 1302 responds by sending a notification to the management platform 116.

Each of the repeater modules 512, 514, 612, 614, 712, 714, 812 and 814 of each of the repeaters 102–110 tracks and stores statistics for each port coupled to that module in corresponding memories 505, 519, 605, 619, 705, 719, 805 and 819 as previously described. The management platform 116 sends a request including an OID identifying an object within any one of the MIBs M1–M5 to the repeater 102 to request information or statistics corresponding to that object. The management agent 1302 responds by accessing the memory associated with one or more of the repeater modules of the repeaters 102–110 and provides the requested information to the management platform 116. Depending upon the requested information and the MIB, the information may be "unified" for both the 10 and 100 repeater domains or the information may be specific to either. If the information is one or more unified statistics, the management agent 1302 typically combines the statistics from the 10 and 100 Mbps repeater modules of a repeater unit and provides the combined number or unified statistic to the management platform 116. The unified statistic is typically achieved by summing the corresponding values together for a total count for the corresponding statistic. It is contemplated that values may be combined in other manners, such as subtraction, multiplication, division, etc. Otherwise, the information is retrieved from a specific repeater module. In this manner, the management platform 116 may ask for port information including statistics in one of three different ways: 10 only, 100 only or a summation of both.

For example, a VALID FRAME COUNT is a number that is tracked, maintained or updated and stored by each repeater module 512, 514, 612, 614, 712, 714, 812 and 814 identifying the number of frames (or packets) of valid frame length that have been received at a given port associated with a particular repeater module. A given port, however, may be coupled to a 10 Mbps device, a 100 Mbps device, or may have been coupled to both sequentially during operation. The latter case would occur if a 10 Mbps device was coupled to a given port for a period of time and removed, and then a 100 Mbps device was coupled to that same port for another period of time. The 10 Mbps repeater module tracks the 10 Mbps statistics of the first device and the 100 Mbps repeater module tracks the 100 Mbps statistics of the second device for that port. Thus, any given single port may have statistics for both. One or more of the MIBs of the repeater 102 includes a corresponding object indicating the number of valid frames. However, the object may be unified for both the 10 and 100 segments or may be specific to either.

The management platform 116 sends a statistics request to the management agent 1302 that includes an OID identifying the object of a MIB to request the number of valid frames received by a particular port. If the object or the MIB is not unified, then the request indicates the particular repeater of interest, whether the 10 or 100 statistics are desired and the port number. For example, the request may include a device parameter indicating the particular repeater module, a rate parameter indicating 10 or 100 and a port parameter indicating any one of the 24 ports PORT 1–PORT 24. The management agent 1302 responds by retrieving and providing the corresponding VALID FRAME COUNT from the corresponding repeater module. If, however, the object is unified, then the management agent 1302 responds by retrieving the VALID FRAME COUNT from both the 10 and 100 repeater modules, combines the two numbers such as summing the numbers together, and provides the sum to the management platform 116.

The MIB 1310 includes a corresponding "rptrMonitorPortReadableFrames" object indicating the number of valid frames for each of the ports. The OID of the request is, or otherwise corresponds to "rptrMonitorPortReadableFrames" if the MIB 1310 is intended for the request. If ten (10) valid frames have been received from a 100 Mbps device and if five (5) valid frames have been received by a 10 Mbps device at the same port PORT 2 of the repeater 102, then the memory 505 of the repeater 102 stores a value of five (5) and the memory 519 stores a value of ten (10). The management platform 116 sends a request to the management agent 1302 that includes an OID identifying the rptrMonitorPortReadableFrames object of the MIB 1310 to request the number of valid frames received by PORT 2 of the repeater 102. The management agent 1302 responds by retrieving the VALID FRAME COUNT number from both of the repeater modules 512 and 514, sums the numbers together resulting in fifteen (15) valid frames, and provides the sum value to the management platform 16.

The MIB 1318 includes an extended port information table having a table entry corresponding to each statistic for each port defined in the network system 100. An INDEX is defined for each entry including a UNIT ID parameter identifying the particular repeater 102–110, a RPTR ID parameter identifying either the 10 or 100 repeater module, and a PORT ID parameter identifying a particular port. Suppose the UNIT IDs of the repeaters 102–110 are 1–5, respectively, the RPTR ID is "10" for a 10 Mbps repeater module and is "100" for a 100 Mbps repeater module and the PORT ID is 1–24 for ports PORT 1–PORT 24, respectively. The MIB 1318 also includes an object "n2feExtPortReadableFrames" corresponding to the number of valid frames received at a port. The management platform 116 sends a request with an OID= "n2feExtPortReadableFrames" with parameters UNIT ID, RPTR ID and PORT ID identifying the particular repeater, the repeater domain and the port, respectively. The management agent 1302 returns the corresponding statistic number to the management platform 116.

For example, if the management platform 116 sends a request with an OID="n2feExtPortReadableFrames" with parameters UNIT ID=1, RPTR ID=100 and PORT ID=2 for PORT 2 of the repeater 102, and assuming the same frame count numbers of 10 and 5 as described above, the management agent 1302 returns a value of ten (10) to the management platform 116 for the repeater module 514. If, however, the management platform 116 sends a request with an OID="n2feExtPortReadableFrames" with parameters UNIT ID=1, RPTR ID=10 and PORT ID=2 for PORT 2 of the repeater 102, then the management agent 1302 returns a value of five (5) to the management platform 116 for the repeater module 512.

Table 1 below lists several statistics that are tracked and maintained at the repeater stack-level for two of the MIBs, M1 1310 and M4 1316:

TABLE 1

Repeater Module-Level Statistics by MIB

| Repeater Module-Level Statistic | MIB M1 1310 | MIB M4 1316 |
| --- | --- | --- |
| Total Octets | | ✓ |
| Total Partitioned Ports | ✓ | |
| Transmit Collisions | ✓ | ✓ |
| Jabbers | | ✓ |

Table 2 below lists several statistics that are tracked and maintained at the unit (or repeater unit 102–110) level for the MIBs M1 1310, M3 1314, M4 1316 and M5 1318:

TABLE 2

Unit-Level Statistics by MIB

| Unit-Level Statistic | M1 1310 | M3 1314 | M4 1316 | M5 1318 |
|---|---|---|---|---|
| Total Frames | ✓ | ✓ | | ✓ |
| Total Octets | ✓ | ✓ | | ✓ |
| Total Errors | ✓ | | | |
| Up-time | | | ✓ | |
| Dropped Events | | ✓ | | ✓ |
| Broadcast Packets | | ✓ | | |
| Multicast Packets | | ✓ | | |
| FCS and Alignment Errors | | ✓ | | ✓ |
| Undersized Packets | | ✓ | | ✓ |
| Runts | | | | ✓ |
| Fragments | | ✓ | | |
| Collisions | | ✓ | | ✓ |
| Oversized Packets | | ✓ | | ✓ |
| Jabbers | | ✓ | | |
| Late Events | | | | ✓ |
| Very Long Events | | | | ✓ |
| Data Rate Mismatches | | | | ✓ |
| Packets 0–64 Octets | | ✓ | | |
| Packets 65–127 Octets | | ✓ | | |
| Packets 65–127 Octets | | ✓ | | |
| Packets 128–255 Octets | | ✓ | | |
| Packets 256–511 Octets | | ✓ | | |
| Packets 512–1023 Octets | | ✓ | | |
| Packets 1024–1518 Octets | | ✓ | | |
| Utilization | | | | ✓ |

Table 3 below lists several statistics that are tracked and maintained at the port level for the MIBs MI 1310, M3 1314, M5 1318 and for the VT100 emulation by the management platform 116:

TABLE 3

Port-Level Statistics by MIB and VT100

| Port-level Statistic | M1 1310 | M3 1314 | M5 1318 | VT100 |
|---|---|---|---|---|
| Readable Frames | ✓ | ✓ | ✓ | ✓ |
| Readable Octets | ✓ | ✓ | ✓ | ✓ |
| Collisions | ✓ | ✓ | ✓ | ✓ |
| Short Events | ✓ | ✓ | ✓ | ✓ |
| Runt Frames | ✓ | ✓ | ✓ | |

TABLE 3-continued

Port-Level Statistics by MIB and VT100

| Port-level Statistic | M1 1310 | M3 1314 | M5 1318 | VT100 |
|---|---|---|---|---|
| Very Long Events | ✓ | ✓ | ✓ | ✓ |
| Frames Too Long | ✓ | ✓ | ✓ | ✓ |
| Late Events | ✓ | ✓ | ✓ | |
| FCS Errors | ✓ | ✓ | ✓ | ✓ |
| Frame Alignment Errors | ✓ | ✓ | ✓ | ✓ |
| Data Rate Mismatches | ✓ | ✓ | ✓ | ✓ |
| Total Errors | ✓ | ✓ | ✓ | |
| Last Source Address | ✓ | ✓ | ✓ | ✓ |
| Source Address Changes | ✓ | ✓ | ✓ | ✓ |
| Auto-partitions | ✓ | ✓ | ✓ | ✓ |
| Dropped Events | | | ✓ | |
| Coding Errors (100M bps) | | | ✓ | |
| Isolates (100M bps) | | | ✓ | |

The management agent 1302 informs the management platform 116 of certain predetermined events that occur in the network system 100 using SNMP traps. Traps are analogous to interrupts used by processors in computer systems, and are often used to indicate unusual events or exception conditions. Examples of such events include system crash and reboot, reset, starting conditions (coldStart, warmStart), failure of a port or link (linkDown, linkUp), an overload condition determined by a threshold parameter being violated, etc., and includes enterprise-specific events (enterpriseSpecific) which indicates the type of trap. The management agent 1302 is configured or programmed to monitor one or more parameters, objects, a group of objects, etc., and to take an action in response to a change of a parameter, object, condition, etc. The response often includes informing the management platform 116 of the event by sending an unsolicited notification via the management I/F 1320.

Table 4 below summarizes the traps generated by the management agent 1302, where the MIB column indicates the MIB or RFC that defines the traps, the trap column lists the traps by a convenient name, the "RFC 1157 Trap Type" column lists the generic trap category of the SNMP specification contained in RFC 1157 to which the trap belongs, and the "Variable Bindings" column lists additional MIB objects that are included in the trap message:

TABLE 4

Traps Supported by the Management Agent 1302

| MIB | Trap | RFC1157 Trap Type | Variable Bindings |
|---|---|---|---|
| RFC1157 (SNMP Specification) | Cold Start | coldStart(1) | (none) |
| | Authentication Failure | authenticationFailure(4) | (none) |
| RFC1757 (RMON) | Rising Alarm | enterpriseSpecific(6): rmon.1 | alarmIndex, alarmVariable, alarmSampleType, alarmValue, alarmRisingThreshold |
| | Falling Alarm | enterpriseSpecific(6): rmon.2 | alarmIndex, alarmVariable, alarmSampleType, alarmValue, alarmFallingThreshold |
| MIB 1 1310 (RFC 1516) | Health | enterpriseSpecific(6): snmpDot3RptrMgt.1 | rptrOperStatus, rptrHealthText |
| | Group Change | enterpriseSpecific(6): snmpDot3RptrMgt.2 | rptrGroupIndex |

TABLE 4-continued

Traps Supported by the Management Agent 1302

| MIB | Trap | RFC1157 Trap Type | Variable Bindings |
|---|---|---|---|
| | Reset | enterpriseSpecific(6): snmpDot3RptrMgt.3 | rptrOperStatus |
| MIB 4 1316 (Novell) | Health | enterpriseSpecific(6): nSnmpDot3RptrMgt.1 | rptrBasHealthState, rptrBasHealthText, rptrBasHealthData, rptrBasID, rptrExtName |
| | Group Change | enterpriseSpecific(6): nSnmpDot3RptrMgt.2 | RptrBasGroupMap, rptrBasID, rptrExtName |
| | Reset | enterpriseSpecific(6): nSnmpDot3RptrMgt.3 | rptrBasHealthState, rptrBasHealthText, rptrBasHealthData, rptrBasID, rptrExtName |

As noted in Table 4 above, the MIBs M1 and M4 each include similar traps, where it is desired to use one set or the other but not both. Both of the MIBs M1 and M4 include a "HEALTH" trap, a "GROUP CHANGE" trap and a "RESET" trap, where the specifics of these differ with the particular MIB. The HEALTH trap is issued when changes occur in a repeater's operational status. A GROUP CHANGE trap is issued when a repeater unit is added to or removed from the network system 100 stack. The RESET trap is issued after completion of a reset condition. The GROUP CHANGE trap of the MIB M1 1310 provides the unit number whose status has changed whereas the MIB M4 1316 provides a 16-bit bitmap showing which units are currently present in the stack. The conditions that cause each of these traps are the same, but the trap contents are different. Therefore, it is desired to use either the M1 or the M4 type traps but not both.

The MIB M5 1318 is preferably a private or enterprise specific MIB that includes the following object definition for programming M1 or M4 type traps:

```
n2feTrapSupport OBJECT-TYPE
    SYNTAX    INTEGER
    {
    rfc1516-traps-only(1)
    novell-traps-only(2)
    }
    ACCESS    read-write
    STATUS    mandatory
    ::= {n2feUnitInfo x}
``` where "rfc1516" corresponds to the MIB M1 1310 and "novell" corresponds to the MIB M4 1316. The management platform 116 sends an SNMP SET request to program the trap support value to (1) to select the MIB M1 1310 type traps and to (2) to select the MIB M4 1316 type traps. The management agent 1302 receives the request and programs the trap support value corresponding to the object definition within the MIB M5 1318. The management agent 1302 then uses the appropriate trap definitions as determined by the trap support value.

A default may be set for the trap support object. For example, the trap support object may have a default value of (1) to program the traps to the MIB M1 1310 type. In this manner, the trap select object is programmed to a value of (1) if it is desired that the management platform 116 executes a management application compatible with RFC1516 type traps. Alternatively, the trap select object is programmed to a value of (2) if it is desired that the management platform 116 executes a management application, such as Novell's ManageWise™, compatible with Novell's Ethernet™ Hub MIB. In this manner, the management agent 1302 of the managing repeater 102 supports either trap type and definition. Also, the trap support value may be stored in the NVRAM 526 if desired so that the programmed value remains unchanged during power cycles.

The management agent 1302 and the MIB M5 1318 support intrusion detection to detect unauthorized nodes or stations and intrusion prevention to prevent intruders from transmitting on the network system 100 on any of the ports of any of the repeaters 102–110. Intrusion is detected regardless of the transmission rate of the node or station coupled to a port. Within the MIB M5 1318, each port has several intrusion-related MIB objects or variables, including an n2feINTRUSIONPORTSTATUS object indicating the intrusion status of the port (disable/enable/tripped) and an n2feINTRUSIONPORTMACADDRESS object programmable with an authorized MAC address for that port. The embodiment shown allows only one authorized MAC address to be programmed per port. Alternative embodiments allow any practicable number of authorized MAC addresses to be programmed for each port. If a node or station transmits a source MAC address that is not equal to the authorized MAC address, the port is disabled and the management agent 1302 generates an SNMP "health state" trap indicating the intruded port. The intrusion-disabled port remains disabled until re-enabled by the management platform 116 using SNMP (via a user or network operator). The n2feINTRUSIONPORTSTATUS (intrusion status of each port) and the n2feINTRUSIONPORTMACADDRESS (the authorized MAC address) variables are stored in the NVRAM 526. In this manner, when the network system 100 or any particular repeater 102–110 resets due to power interruption or software download, all of the ports previously disabled via the intrusion feature remain disabled during boot phase and after the management agent 1302 resumes operation until explicitly enabled by the management platform 116.

In the embodiment shown, each of the repeater modules 512, 514, 612, 614, 712, 714 and 812, 814 is programmable by the management agent 1302 with an authorized MAC address per port. The authorized MAC addresses may be stored in any convenient manner, such as in the memories 505, 605, 705 or 805 of the repeater modules 512, 612, 712 or 812, respectively, and the memories 519, 619, 719 and 819 for the repeater modules 514, 614, 714 and 814, respectively. As described above, the authorized MAC addresses are also stored in the NVRAM 526 by the management agent 1302. The management agent 1302 also enables any one or more of the repeater modules for intrusion monitoring. When a port is to be secured by assigning an authorized MAC address, the management agent 1302 preferably programs and enables both of the 10 Mbps and 100 Mbps repeater modules associated with that port. For example, to secure PORT 3 of the repeater 102, both of the repeater modules 512 and 514 are programmed with the same MAC address for PORT 3, and both modules are enabled for port intrusion monitoring. Each repeater module that is enabled for port intrusion monitors the source MAC address of each packet received on a secured port. For Ethernet™ packets, the source address is provided within the first 12 bytes of the packet. The repeater module then compares the received source address with the assigned MAC address for that port. If the addresses match, the packet is processed as normal. If the addresses do not match, the management agent 1302 is informed and the port is disabled.

Each of the repeater modules informs the management agent 1302 of an unauthorized intruder by asserting an interrupt on the management bus 1300 to the CPU 1002 executing the management agent 1302. Alternatively, the repeater module sets a flag in memory or a register, where the flag is periodically polled by the management agent 1302. In the embodiment shown, the 10 Mbps repeater modules 512, 612, 712 and 812 are configurable to automatically disable the intruded port. The management agent 1302 disables the intruded port of the 100 Mbps repeater modules 514, 614, 714 and 814. When the management agent 1302 is informed of an intruded port, the management agent 1302 disables the port for the associated repeater module for that port. For example, if the repeater module 512 detects an intruded port, such as PORT 4, it generates an interrupt to inform the management agent 1302. The management agent 1302 then disables the same port PORT 4 for the repeater module 514. Likewise, if the repeater module 514 detects an intruded port, the management agent 1302 disables the same port for the repeater module 512.

Based on the foregoing, those skilled in the art now understand and appreciate that the stackable integrated system described herein is operable with at least two different baseband signaling specifications that operate at different transmission rates. Because the system provided in accordance with the teachings of the present invention reduces the total number of components typically used for effectuating data transmissions across separate basebands, it provides higher reliability and cost-effectiveness. Because of the reduction in the components and stacked configuration, the system provides a highly desirable form-factor such that less space is needed for installation and operation.

The stackable integrated system described herein also provides for unified management of all of the ports. A separate set of statistics are kept for each port and for each transmission rate. A management system responds to statistics requests by providing statistics for either transmission rate or a combination of both in the unified case. Intrusion detection and prevention are supported on any port in a unified manner. Several standard management databases are supported. The management system is programmable to select the traps of any particular non-standard or standard databases, such as the standard Ethernet™ Repeater MIB implemented according to RFC 1516 or the Ethernet™ Hub MIB by Novell. Intrusion detection is supported for any and all ports of all repeater units in a stack regardless of transmission rate.

Although a preferred embodiment of the present invention has been illustrated in the accompanying drawings and described in the foregoing Detailed Description, it will be understood that the invention is not limited to the embodiment disclosed, but is capable of numerous rearrangements, modifications and substitutions without departing from the spirit of the invention as set forth and defined by the following claims. For example, whereas the functionality of a slow first segment, a fast second segment and a switching device therebetween may all be implemented in a single substrate integrated circuit solution, the respective functionality may also be partitioned to produce a single board-level solution. Also, though in the embodiment shown the switch device learns the addresses of devices of one segment, it could be configured to learn the MAC addresses of the other segment or of both segments. Furthermore, although the presently illustrated exemplary embodiment of the present invention utilizes Ethernet™ technology, those skilled in the art will readily appreciate upon reference hereto that the teachings of the present invention may be extended to other LAN technologies, such as Token Ring™, FOIRL, FDDI and the like.

Also, as has been mentioned earlier, a managed stack according to the present invention may be provided with additional backplanes, either fast or slow. Nor is it a requirement of the present invention that the stackable fast backplane must match the individual fast segments of the stackable units in the bit transmission rate. It is quite possible to provide a Gigabit/second type backplane while the so-called fast segments of the units may operate only at 100 Mbps. The integrated switching functionality of the devices of the present invention may be coupled with a routing device, giving rise to a "brouter" functionality. It may be appreciated that a simple router or a bridge may also provide bridging capability. Moreover, a plurality of integrated hubs may be provided in accordance with the teachings of the present invention wherein each such hub comprises multiple segments, each having a different baseband capability. These hubs may be disposed in disparate domains and interconnected in a stackable arrangement via one or more backplanes. Accordingly, it is envisaged that all these rearrangements, modifications, substitutions and extensions are comprehended within the scope of the present invention which is solely limited by the following claims.

What is claimed is:

1. A network device with selectable traps, comprising:
a memory that stores a management database including a plurality of trap definitions and a programmable parameter for selecting any one of said plurality of trap definitions; and
management processing logic coupled to said memory that executes a management agent that issues traps according to a selected one of said plurality of trap definitions depending upon said programmable parameter.

2. The network device of claim 1, further comprising:
said memory storing a first management database including a first set of trap definitions and a second management database including a second set of trap definitions; and
said management processing logic issuing traps according to one of said first and second sets of trap definitions depending upon said programmable parameter.

3. The network device of claim 2, wherein said first and second management databases are both management information bases according to the simple network management protocol.

4. The network device of claim 3, wherein said first management database is a standard network device management information base.

5. The network device of claim 4, wherein said first management database is implemented according to RFC 1516.

6. The network device of claim 2, wherein said first and second sets of trap definitions include a health trap definition, a group change definition and a reset definition.

7. The network device of claim 1, wherein said programmable parameter is an object of a unified management database used by said management agent.

8. The network device of claim 1, wherein said programmable parameter is programmed by default to select one of said plurality of trap definitions.

9. The network device of claim 1, wherein said programmable parameter is stored in nonvolatile memory to maintain selection through a power cycle.

10. The network device of claim 1, wherein said management processing logic includes a microprocessor.

11. A network system, comprising:
a network device with selectable traps, including:
an interface;
a management database including a first set of trap definitions, a second set of trap definitions and a programmable parameter for selecting between said first set of trap definitions and said second set of trap definitions; and
management processing logic that executes a management agent that accesses said management database and that issues traps according to one of said first and second sets of trap definitions depending upon said programmable parameter; and
a management unit coupled to said network device interface that programs said programmable parameter and that receives said traps via said interface.

12. The network system of claim 11, wherein said interface is a serial port.

13. The network system of claim 11, wherein said network device is a multiple port repeater.

14. The network system of claim 11, wherein said management unit executes a management console according to the simple network management protocol (SNMP).

15. The network system of claim 14, wherein said management unit programs said programmable parameter by sending an SNMP request to said management agent via said interface.

16. The network system of claim 11, wherein said management database includes first and second management information bases implemented according to the simple network management protocol (SNMP).

17. The network system of claim 16, wherein said first management information base is implemented according to RFC 1516.

18. The network system of claim 11, wherein said first and second sets of trap definitions include a health trap definition, a group change definition and a reset definition.

19. The network system of claim 11, wherein said programmable parameter is an object of a unified management database used by said management agent.

* * * * *